United States Patent
Anantharaman

(10) Patent No.: US 10,430,559 B2
(45) Date of Patent: *Oct. 1, 2019

(54) DIGITAL RIGHTS MANAGEMENT IN VIRTUAL AND AUGMENTED REALITY

(71) Applicant: Adobe Inc., San Jose, CA (US)

(72) Inventor: Arun Anantharaman, Los Altos Hills, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,032

(22) Filed: Oct. 18, 2016

(65) Prior Publication Data

US 2018/0107805 A1 Apr. 19, 2018

(51) Int. Cl.
*G06F 21/10* (2013.01)
*G06F 3/01* (2006.01)

(52) U.S. Cl.
CPC .............. *G06F 21/10* (2013.01); *G06F 3/011* (2013.01); *G06F 2221/0713* (2013.01)

(58) Field of Classification Search
CPC .................................. G06F 21/10; H04L 63/10
See application file for complete search history.

(56) References Cited

U.S. PATENT DOCUMENTS

| | | |
|---|---|---|
| 7,893,935 B1 | 2/2011 | Neely et al. |
| 8,217,856 B1 | 7/2012 | Petrou |
| 8,303,387 B2 | 11/2012 | Spivack |
| 8,312,552 B1 * | 11/2012 | Hadden ................... G06F 21/10 713/176 |
| 8,745,494 B2 | 6/2014 | Spivack |
| 8,799,810 B1 | 8/2014 | Wheeler |
| 8,825,081 B2 | 9/2014 | Arrasvuori et al. |
| 8,866,847 B2 | 10/2014 | Bedi et al. |
| 9,058,790 B2 | 6/2015 | Kato |
| 10,198,846 B2 | 2/2019 | Carr |
| 2008/0004950 A1 | 1/2008 | Huang et al. |
| 2009/0037822 A1 * | 2/2009 | Kandekar .............. G06Q 10/00 715/733 |
| 2009/0048908 A1 * | 2/2009 | Kaplan .................. G06Q 30/02 705/7.33 |
| 2009/0087024 A1 | 4/2009 | Eaton et al. |
| 2009/0094518 A1 | 4/2009 | Lawther et al. |

(Continued)

OTHER PUBLICATIONS

"Non-Final Office Action", U.S. Appl. No. 15/244,656, dated Jun. 14, 2017, 29 pages.

(Continued)

*Primary Examiner* — Harunur Rashid
(74) *Attorney, Agent, or Firm* — SBMC

(57) ABSTRACT

Digital rights management techniques are described that address traits of a behavior of a user population that is to interact with digital content as part of a virtual or augmented reality environment. A digital rights management (DRM) module is implemented to manage a digital rights management policy to dynamically address traits and changes to the traits of a behavior of users that consume the digital content as part of an augmented or virtual reality environment. In another example, the DRM module may be configured to control access to physical objects through use of digital content output by an output device as part of the augmented or virtual reality environment.

20 Claims, 13 Drawing Sheets

(56) References Cited

U.S. PATENT DOCUMENTS

| | | |
|---|---|---|
| 2010/0082436 A1 | 4/2010 | Maghoul et al. |
| 2010/0226535 A1 | 9/2010 | Kimchi et al. |
| 2011/0068378 A1 | 3/2011 | Liu et al. |
| 2011/0258049 A1 | 10/2011 | Ramer et al. |
| 2011/0283223 A1 | 11/2011 | Vaittinen et al. |
| 2012/0030227 A1 | 2/2012 | Mital et al. |
| 2012/0140027 A1 | 6/2012 | Curtis et al. |
| 2012/0272179 A1 | 10/2012 | Stafford |
| 2013/0044912 A1 | 2/2013 | Kulkarni et al. |
| 2013/0050258 A1 | 2/2013 | Liu et al. |
| 2013/0236161 A1 | 9/2013 | Takeda |
| 2013/0258138 A1 | 10/2013 | Ma et al. |
| 2013/0307875 A1 | 11/2013 | Anderson |
| 2014/0195968 A1 | 7/2014 | Banavara |
| 2014/0268356 A1 | 9/2014 | Bolas et al. |
| 2014/0333664 A1 | 11/2014 | Williams et al. |
| 2015/0058347 A1* | 2/2015 | Russek ............. G06F 17/30265 707/737 |
| 2015/0063661 A1 | 3/2015 | Lee et al. |
| 2015/0120648 A1* | 4/2015 | Slovacek ............ G06F 17/3002 707/609 |
| 2015/0220802 A1 | 8/2015 | Mazur et al. |
| 2015/0227795 A1 | 8/2015 | Starner et al. |
| 2015/0234796 A1* | 8/2015 | Williams ............ G06F 17/2247 715/229 |
| 2015/0243078 A1 | 8/2015 | Watson et al. |
| 2015/0254892 A1 | 9/2015 | Smith et al. |
| 2015/0324698 A1* | 11/2015 | Karaoguz ........... G06F 19/3437 706/46 |
| 2015/0348322 A1 | 12/2015 | Ligameri et al. |
| 2016/0027214 A1 | 1/2016 | Memmott et al. |
| 2016/0055201 A1 | 2/2016 | Poupyrev et al. |
| 2016/0093105 A1 | 3/2016 | Rimon et al. |
| 2016/0112667 A1 | 4/2016 | Park et al. |
| 2016/0133052 A1 | 5/2016 | Choi et al. |
| 2016/0343107 A1 | 11/2016 | Newman et al. |
| 2016/0364916 A1 | 12/2016 | Terahata |
| 2017/0026577 A1 | 1/2017 | You et al. |
| 2017/0061696 A1 | 3/2017 | Li et al. |
| 2017/0064374 A1 | 3/2017 | Eim et al. |
| 2017/0153698 A1 | 6/2017 | Bamidele et al. |
| 2017/0160815 A1 | 6/2017 | Glazier et al. |
| 2017/0163839 A1* | 6/2017 | Arana .................. H04N 1/3232 |
| 2017/0201808 A1 | 7/2017 | Chowdhary et al. |
| 2017/0266554 A1 | 9/2017 | Marks et al. |
| 2017/0269685 A1 | 9/2017 | Marks et al. |
| 2017/0269713 A1 | 9/2017 | Marks et al. |
| 2017/0277256 A1 | 9/2017 | Burns et al. |
| 2018/0005443 A1 | 1/2018 | Poulos et al. |
| 2018/0039479 A1 | 2/2018 | Fransen et al. |
| 2018/0041750 A1 | 2/2018 | Kim |
| 2018/0046363 A1 | 2/2018 | Miller et al. |
| 2018/0053236 A1 | 2/2018 | Fransen et al. |
| 2018/0053333 A1 | 2/2018 | Carr |
| 2018/0059898 A1 | 3/2018 | Miller et al. |
| 2018/0061128 A1 | 3/2018 | Cabanier et al. |
| 2018/0075655 A1 | 3/2018 | Cabanier et al. |
| 2018/0188801 A1 | 7/2018 | Leppanen et al. |
| 2018/0330548 A1 | 11/2018 | Cabanier et al. |

OTHER PUBLICATIONS

"Pre-Interview Communication", U.S. Appl. No. 15/262,616, dated Sep. 21, 2017, 3 pages.
"First Action Interview Office Action", U.S. Appl. No. 15/262,616, dated Nov. 2, 2017, 3 pages.
"Final Office Action", U.S. Appl. No. 15/244,656, dated Sep. 21, 2017, 48 pages.
"Augmented Reality & Visual Discovery Solutions | Blippar", Retrieved at: https://blippar.com/en/—on Aug. 22, 2016, 10 pages.
"PAVR Creates Emmy Award-Winning 360-Degree Video for FOX Sports", The Creative.Cloud Team—Retrieved at: http://blogs.adobe.com/creativecloud/pavr-creates-emmy-award-winning-360-degree-video-for-fox-sports/, Jul. 13, 2016, 3 pages.
Chuang,"Animating Pictures with Stochastic Motion Textures", ACM Transactions on Graphics, vol. 24, No. 3, to appear, (Proceedings of ACM SIGGRAPH 2005, Jul. 2005, Los Angeles), Jul. 2005, 8 pages.
Conner-Simons,"Reach in and Touch Objects in Videos with "Interactive Dynamic Video"", Retrieved at: https://www.csail.mit.edu/reach_in_and_touch_objects_in_videos_with%20_interactive_dynamic_video, Aug. 2, 2016, 3 pages.
Lumb,"New MIT tech lets you mess with objects in pre-recorded video—Yes, they've already successfully tested it in 'Pokémon Go.'", Retrieved at: https://www.engadget.com/2016/08/03/new-mit-tech-lets-you-mess-with-objects-in-pre-recorded-video/, Aug. 3, 2016, 2 pages.
"Corrected Notice of Allowance", U.S. Appl. No. 15/262,616, dated May 8, 2018, 11 pages.
"Final Office Action", U.S. Appl. No. 15/243,130, dated Apr. 18, 2018, 14 pages.
"Notice of Allowance", U.S. Appl. No. 15/262,616, dated Apr. 27, 2018, 14 pages.
"Pre-Interview Communication", U.S. Appl. No. 15/228,680, dated May 17, 2018, 11 pages.
Dailey,"EMPATH: A Neural Network that Categorizes Facial Expressions", Journal of cognitive neuroscience 14.8, 2002, pp. 1158-1173.
"Pre-Interview Communication", U.S. Appl. No. 15/243,130, dated Dec. 8, 2017, 16 pages.
"Pre-Interview Communication", U.S. Appl. No. 15/227,300, dated Feb. 5, 2018, 3 pages.
Fei-Fei,"A Bayesian Hierarchical Model for Learning Natural Scene Categories", Computer Vision and Pattern Recognition, 2005, 8 pages.
"Advisory Action", U.S. Appl. No. 15/297,032, dated Aug. 1, 2018, 5 pages.
"Blippar: Augmented Reality App Turns Everyday Products into Interactive Experience", Business NewsDaily, https://www.businessnewsdaily.com/5627-blippar-app.html, Dec. 16, 2013, 3 pages.
"First Action Interview Office Action", U.S. Appl. No. 15/227,300, dated Jun. 5, 2018, 5 pages.
"First Action Interview Office Action", U.S. Appl. No. 15/228,680, dated Jul. 5, 2018, 11 pages.
"Non-Final Office Action", U.S. Appl. No. 15/244,656, dated Jun. 28, 2018, 70 pages.
"Pre-Interview First Office Action", U.S. Appl. No. 15/233,532, dated Jun. 1, 2018, 4 pages.
"Restriction Requirement", U.S. Appl. No. 15/246,137, dated Jul. 20, 2018, 6 pages.
"Final Office Action", U.S. Appl. No. 15/227,300, dated Nov. 30, 2018, 15 pages.
"Final Office Action", U.S. Appl. No. 15/228,680, dated Oct. 12, 2018, 52 pages.
"Final Office Action", U.S. Appl. No. 15/233,532, dated Nov. 1, 2018, 29 pages.
"First Action Interview Office Action", U.S. Appl. No. 15/233,532, dated Aug. 28, 2018, 4 pages.
"First Action Interview Office Action", U.S. Appl. No. 15/246,137, dated Dec. 6, 2018, 3 pages.
"Non-Final Office Action", U.S. Appl. No. 15/246,137, dated Sep. 10, 2018, 20 pages.
"Notice of Allowance", U.S. Appl. No. 15/243,130, dated Oct. 24, 2018, 13 pages.
"Pre-Interview First Office Action", U.S. Appl. No. 15/246,137, dated Sep. 21, 2018, 5 pages.
"Final Office Action", U.S. Appl. No. 15/244,656, dated Jan. 28, 2019, 62 pages.
"Non-Final Office Action", U.S. Appl. No. 15/227,300, dated Mar. 22, 2019, 12 pages.
"Final Office Action", U.S. Appl. No. 15/246,137, dated May 3, 2019, 23 pages.
"Non-Final Office Action", U.S. Appl. No. 15/228,680, dated Jun. 11, 2019, 61 pages.

(56) References Cited

OTHER PUBLICATIONS

"Non-Final Office Action", U.S. Appl. No. 15/233,532, dated Aug. 8, 2019, 37 pages.
"Pre-Interview First Office Action", U.S. Appl. No. 16/045,259, dated Jul. 30, 2019, 3 pages.
"Restriction Requirement", U.S. Appl. No. 15/238,374, dated May 24, 2019, 7 pages.

* cited by examiner

DIGITAL RIGHTS MANAGEMENT IN VIRTUAL AND AUGMENTED REALITY

BACKGROUND

Digital rights management is used to control use of digital content, e.g., to alter, consume, or distribute digital content. Conventional digital rights management techniques are based on qualities that are unique to a particular user. For example, a purchaser of an application from a conventional application store, a song from an online music store, and so on may be given access to the digital content via a user name and password of an account associated with the user for a corresponding service. Other conventional examples include persistent online authentication, unique content identifiers (e.g., CD keys), digital watermarks, and encryption keys associated with a particular user or user's device.

Each of these conventional techniques, however, is rigid and lacks an ability to address changes in how the digital content is to be consumed and thus limit usability of the digital content. Accordingly, this "all-or-nothing" approach to digital content access may be frustrating to consumers of the digital content and thus limit desired distribution of the digital content, and even force the creation of multiple versions of the content and consequently complicate distribution of this digital content to intended recipients. This is especially limiting in augmented and virtual reality environments that are configured to expand a richness of what may be viewed and interacted with by a user. Thus, the rigidity of conventional digital rights management techniques run counter to flexibility of user interaction that is desired as part of augmented and virtual reality environments.

SUMMARY

Digital rights management techniques are described that address traits of a behavior of a user population that is to interact with digital content as part of a virtual or augmented reality environment. In one or more implementations, traits of a behavior are specified that are incorporated as part of a digital rights management policy for digital content. Behaviors describe a way in which a user population acts or conducts itself toward content that is relevant to the population as a whole but is not particular to any specific user of that population.

A digital rights management (DRM) module is implemented to manage a digital rights management policy to dynamically address traits and changes to the traits of a behavior of users that consume the digital content as part of an augmented or virtual reality environment. In this way, DRM techniques may be used to manage interaction with digital content as part of a virtual or augmented reality environment.

In another example, the DRM module may be configured to control access to physical objects through use of digital content output by an output device as part of the augmented or virtual reality environment. This may be used to permit or obscure a view of the physical object based on which traits of a digital rights management policy are met by traits of a user interacting with the augmented or virtual reality environment. Similar techniques may also be used by an audio device, such as to obscure the user from hearing sounds that are not permitted. In this way, DRM techniques may be used to manage interaction with physical objects as part of a virtual or augmented reality environment.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
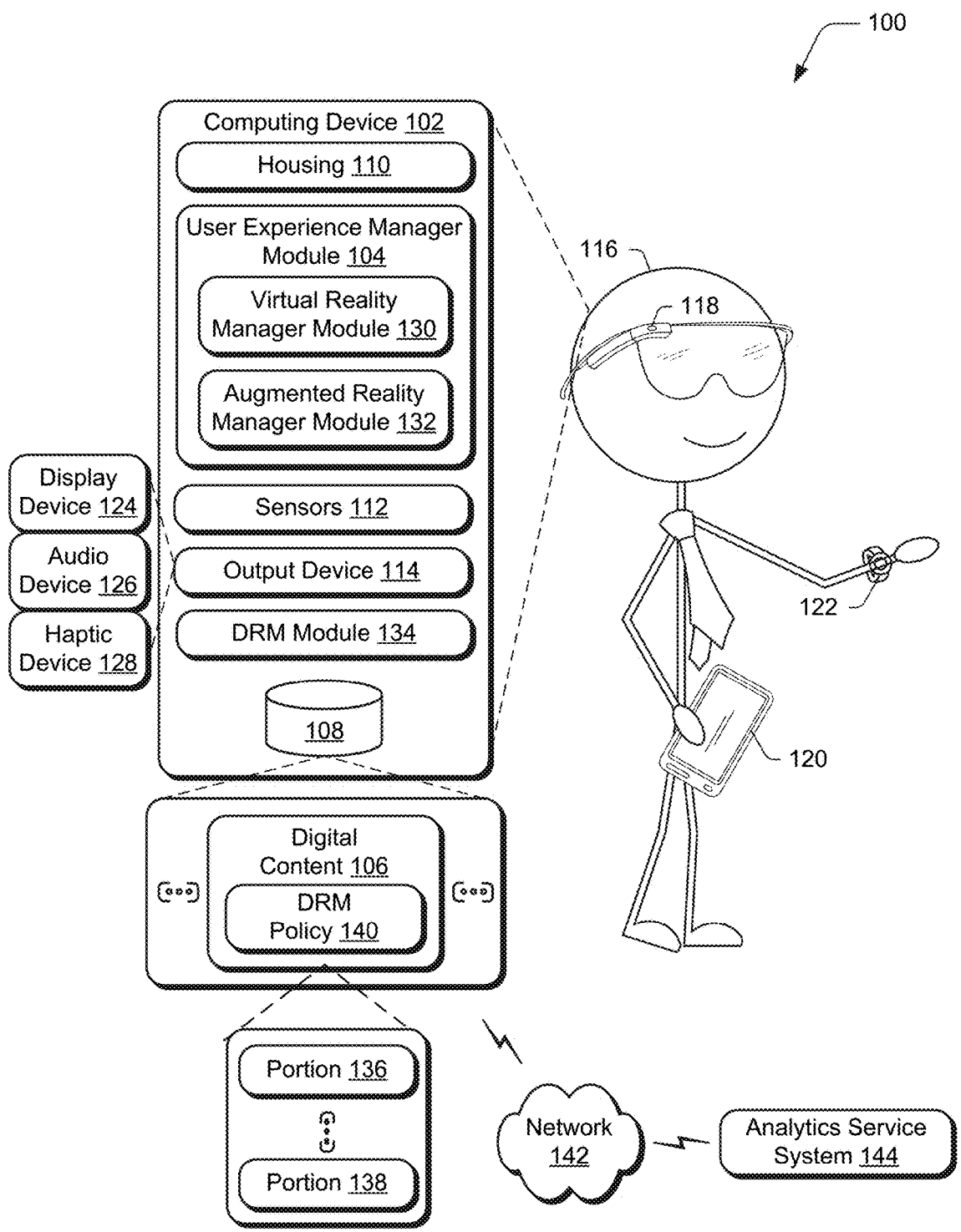
FIG. 1 is an illustration of an environment in an example implementation that is operable to employ digital rights management (DRM) and behavioral trait techniques described herein as part of an augmented or virtual reality environment.

Conventional digital rights management techniques are rigid and inflexible and thus not able to take into account potentially changing traits of a behavior of a user that is to consume digital content. This is especially problematic in virtual and augmented reality environments that by their very nature are configured to expand a richness in display and interaction with digital content. For example, virtual and augmented reality environments are configured to expand how a user may interact with a computing device. However, conventional access to these environments is rigid and inflexible and thus is not able to address differences in behaviors of users who access these environments.

For example, conventional digital rights management techniques typically rely on credentials that are particular to a user such that the credentials uniquely identify that user from each other user. Verification of these credentials is then used to grant access to the digital content in its entirety, e.g., through verification of a user name and password. Thus, conventional digital rights management techniques follow an "all or nothing" approach.

Digital rights management (DRM) techniques are described that react to user traits of a user that is to consume the content. The DRM techniques may then control access to individual portions (i.e., items) of the digital content. This is performed based on traits of behaviors. Behaviors describe a way in which a user population acts or conducts itself toward content that is relevant to the population as a whole but is not particular to any specific user of that population. Traits refer to characteristics of these behaviors. Examples of traits of a behavior include age group, gender, geographic location, profile, business status, membership, device characteristics, motion, environmental, and so forth. Thus, these traits of behaviors are not individual to the user (e.g., user name and password) but rather describe traits that may be common to a user population.

A DRM policy is used to specify which traits of a behavior are to be met by a user to gain access to corresponding portions (i.e., items) of digital content. In one example, analytics data is collected that describes a user population as a whole. To create a DRM policy, for instance, a policy creator may select traits of behaviors of a target population (e.g., demographics collected from analytics data). The selected traits thus define the target population as a subset of a user population that is to receive access to a corresponding portion of the digital content. As described above, behaviors describe a way in which a user population acts or conducts itself toward digital content that is relevant to the population as a whole but is not particular to any specific user of that population.

In this way, access to portions of the digital content may be controlled by a digital rights management module based on contemplated behaviors of consumers of the content. For example, a marketer may wish to include an image as part of a marketing campaign for a population segment. The marketer may then interact with a marketing service system to specify traits of behaviors of the specific target population (e.g., content consumption characteristics related to age, gender, geographic location included as part of analytics data) to be implemented as part of a digital rights management policy as well as characteristics of digital content that is to be created.

The characteristics of the digital content are then used by a creative professional to create the digital content. A digital rights management module is then used to implement the digital rights management policy. The DRM module, for instance, may be embedded as part of the digital content. Thus, in this example a workflow may be supported in which a target population and corresponding policy is first specified through interaction with analytics data and then used as a basis to create digital content for deployment.

Once deployed, the digital rights management (DRM) module may implement the digital rights management policy to dynamically address traits and changes to the traits of a behavior of users that consume the digital content. This control may be implemented locally by embedding the DRM module as part of the content or remotely as part of a DRM system. The DRM module, for instance, is configured to progressively control access to different portions of the content based on which traits are met by a user requesting this access. For example, the DRM module may be configured to monitor user interaction with the digital content as well as other content, the computing device itself, other devices (e.g., wearable devices) and so on. Based on this monitored user interaction, the DRM module may control which portions of the digital content are made available to the user based on the DRM policy.

The digital rights management (DRM) module may also implement the digital rights management policy to dynamically address traits and changes to the traits of a behavior of users that consume the digital content as part of an augmented or virtual reality environment. In an augmented reality environment, a user experience is created by a computing device that employs digital content (e.g., virtual objects) to augment a user's direct view of a physical environment in which the user is disposed. In other words, this direct view of the physical environment is not recreated as part of an augmented reality environment but rather the user actually "sees what is there." The digital content is then used to augment the user's view of this physical environment, such as to play a building game of virtual blocks on a physical table top.

On the other hand, in a virtual reality environment the computing device generates a user experience that employs the digital content to recreate a user's environment. As such, the physical environment is not viewable by the user. Accordingly, in virtual reality an entirety of the user's view is created virtually as part of the environment by the computing device. Digital rights management may be incorporated in both these environments to control access to portions of digital content, whether embedded as part of the digital content or implemented separately as part of a DRM system. In this way, DRM techniques may be used to manage interaction with digital content as part of a virtual or augmented reality environment, further discussion of which is included in the following with respect to FIGS. 5-7.

In another example, the DRM module may be configured to control access to physical objects through use of portions of digital content output by an output device as part of the augmented or virtual reality environment. For example, a physical object, such as a printed document, may include sensitive material. By leveraging the DRM module as part of an augmented or virtual reality environment, access to this sensitive material may be controlled based on which user traits are met by specified traits of a DRM policy. A DRM module, for instance, may determine that the specified traits are not met. In response, a display device used to output a virtual or augmented reality environment may use a portion of digital content to obscure a view of this sensitive material, thereby preventing access as part of the environment. Similar techniques may also be used by an audio device, such as to obscure the user from hearing sounds that are not permitted, e.g., through destructive audio waves (e.g., audio waves that are out of phase 180 degrees with respect to the audio being obscured), introduction of noise, and so forth. If access is permitted (i.e., the user traits match the specified traits of the of the policy), the digital content is configured to permit access to the physical object, e.g., view text, listen to audio, and so on. In this way, DRM techniques may be used to manage interaction with physical objects as part of a virtual or augmented reality environment, further discussion of which is included in the following with respect to FIGS. 8-11.

An example environment is first described that may employ the DRM techniques described herein. Example procedures are also described which may be performed in the example environment as well as other environments. Consequently, performance of the example procedures is not limited to the example environment and the example environment is not limited to performance of the example procedures.

Term Examples

"Digital content" refers to a variety of different types of digital content, such as images, video, sound, and so on. Accordingly, digital content may be created to describe a variety of visual, audio, and/or haptic characteristics, such as objects to be included in an image, general look and feel of the image, types of sounds to be included in sound, locations for capture of video, haptic feedback, and so forth.

An "augmented reality environment" refers to a user experience created by a computing device that employs digital content to augment a user's direct view of a physical environment in which the user is disposed. Thus, digital content in an augmented reality environment is viewed along with a user's physical environment.

A "virtual reality environment" references to a user experience in which the computing device generates a user experience that uses digital content to recreate a user's environment. In a virtual reality environment, the physical environment is not viewable by the user.

"Behaviors" describe a way in which a user population acts or conducts itself toward digital content that is relevant to the population as a whole but is not particular to any specific user of that population. Behaviors are thus contrasted with identification that is limited to a particular user, such as user name and password.

"Traits" of a behavior describe characteristics of this user population that acts or conducts itself toward the digital content. Examples of traits include age group, gender, geographic location, organizational associations such as profile, business status, group membership, and other traits such as device characteristics of a device being used by the user to gain access, temporal traits, motion, and environmental traits.

"Digital rights management" refers to access control techniques that are usable to control access portions of digital content as a whole or particular portions of the content through use of a digital rights management policy, which in the following may be based on traits of a behavior.

A "digital rights management (DRM) policy" describes which traits are to be met by a user population in order to gain access to corresponding portions of digital content. Thus, "DRM traits" refer to traits of the DRM policy that are to be met by "user traits" Thus, "user traits" of a particular user that are met by "DRM traits" as specified by the DRM policy to control access to portions of digital content.

A "digital rights management (DRM) module" describes functionality implemented at least partially in hardware to implement the DRM policy. The DRM module may be embedded as part of the digital content, such as to support offline operation. The DRM module may also be implemented as part of a DRM system, to control streaming of portions of digital content as specified by the DRM policy.

Example Environment

FIG. 1 is an illustration of a digital medium environment in an example implementation that are operable to employ digital rights management in virtual and augmented reality techniques described herein. The illustrated environment 100 includes a computing device 102 configured for use as part of augmented reality and/or virtual reality environments, which may be configured in a variety of ways. In the illustrated environment 100 of FIG. 1, an example of digital rights management as implemented locally is shown (e.g., embedded as part of the digital content 106) whereas in the illustrated environment 1200 of FIG. 12 remote and distributed digital rights management is illustrated.

Figure 13:
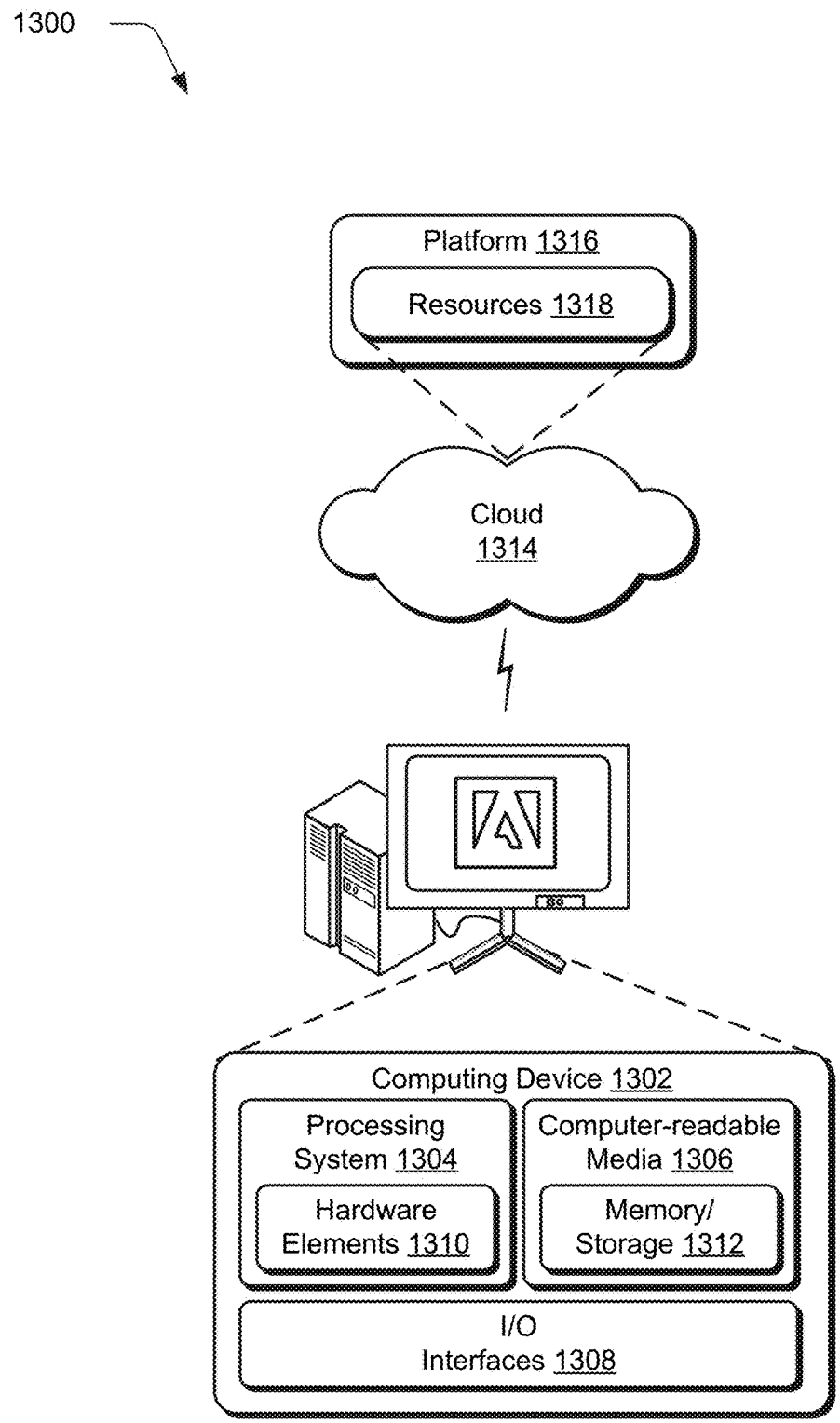
FIG. 13 illustrates an example system including various components of an example device that can be implemented as any type of computing device as described and/or utilize with reference to FIGS. 1-12 to implement embodiments of the techniques described herein.

The computing device 102 is illustrated as including a user experience manager module 104 that is implemented at least partially in hardware of the computing device 102, e.g., a processing system and memory of the computing device as further described in relation to FIG. 13. The user experience manager module 104 is configured to manage output of and user interaction with a digital content 106. The digital content 106 is illustrated as maintained in storage 108 of the computing device 102.

The computing device 102 includes a housing 110, one or more sensors 112, and an output device 114. The housing 110 is configurable in a variety of ways to support interaction with the digital content 106. In one example, the housing 110 is configured to be worn on the head of a user 116 (i.e., is "head mounted" 118), such as through configuration as goggles, glasses, contact lens, and so forth. In another example, the housing 110 assumes a hand-held 120 form factor, such as a mobile phone, tablet, portable gaming device, and so on. In yet another example, the housing 110 assumes a wearable 122 form factor that is configured to be worn by the user 116, such as a watch, broach, pendant, or ring. Other configurations are also contemplated, such as configurations in which the computing device 102 is disposed in a physical environment apart from the user 116, e.g., as a "smart mirror," wall-mounted projector, television, and so on.

The sensors 112 may also be configured in a variety of ways to detect a variety of different conditions. In one example, the sensors 112 are configured to detect an orientation of the computing device 102 in three-dimensional space, such as through use of accelerometers, magnetometers, inertial devices, radar devices, and so forth. In another example, the sensors 112 are configured to detect environmental conditions of a physical environment in which the computing device 102 is disposed, such as objects, distances to the objects, motion, colors, and so forth. A variety of sensor configurations may be used, such as cameras, radar devices, light detection sensors (e.g., IR and UV sensors), time of flight cameras, structured light grid arrays, barometric pressure, altimeters, temperature gauges, compasses, geographic positioning systems (e.g., GPS), and so forth. In a further example, the sensors 112 are configured to detect environmental conditions involving the user 116, e.g., heart rate, temperature, movement, and other biometrics.

The output device 114 is also configurable in a variety of ways to support a virtual or augmented reality environment, such as a display device 124, audio device 126, or haptic device 128. The display device 124, for instance, may be configured as typical display device found on a mobile device such as a camera or tablet computer, a light field display for use on a head mounted display in which a user may see through portions of the display, stereoscopic displays, projectors, television (e.g., a series of curved screens arranged in a semicircular fashion), and so forth. The audio device 126 may include speakers configured to output sound for hearing by the user 116. Other hardware components may also be included as part of the computing device 102, including devices configured to provide user feedback such as haptic responses via a haptic device 128.

The housing 110, sensors 112, and output device 114 are also configurable to support different types of user experiences by the user experience manager module 104. In one example, a virtual reality manager module 130 is employed to support virtual reality. In virtual reality, a user is exposed to an immersive environment, the viewable portions of which are entirely generated by the computing device 102. In other words, everything that is seen by the user 116 is rendered and displayed by the display device 118 through use of the virtual reality manager module 130 by rendering of the digital content 106.

The user 116, for instance, may be exposed to virtual objects as part of the digital content 106 that are not "really there" (e.g., virtual bricks) and are displayed for viewing by the user in an environment that also is completely computer generated. The computer-generated environment may also include representations of physical objects included in a physical environment of the user 116, e.g., a virtual table that is rendered for viewing by the user 116 to mimic an actual physical table in the environment detected using the sensors 112. On this virtual table, the virtual reality manager module 130 may also dispose virtual objects that are not physically located in the physical environment of the user 116, e.g., the virtual bricks as part of a virtual playset. In this way, although an entirely of the display being presented to the user 116 is computer generated, the virtual reality manager module 130 may represent physical objects as well as virtual objects within the display.

The user experience manager module 104 is also illustrated as supporting an augmented reality manager module 132. In augmented reality, the digital content 106 is used to augment a direct view of a physical environment of the user 116. The augmented reality manger module 128, for instance, may detect landmarks of the physical table disposed in the physical environment of the computing device 102 through use of the sensors 112, e.g., object recognition. Based on these landmarks, the augmented reality manager module 132 configures the digital content 106 to be viewed within this environment.

The user 116, for instance, may view the actual physical environment through head-mounted 118 goggles. The head-mounted 118 goggles do not recreate portions of the physical environment as virtual representations as in the VR scenario above, but rather permit the user 116 to directly view the physical environment without recreating the environment. The digital content 106 is then output by the output device 114 to appear as disposed within this physical environment. Thus, in augmented reality the digital content 106 augments what is "actually seen" by the user 116 in the physical environment. In the following discussion, the digital content 106 may be rendered by the user experience manager module 104 in both a virtual reality environment and an augmented reality environment.

A digital rights management (DRM) module 134 is also illustrated. The DRM module 134 is implemented by the computing device 102 to manage access to portions of the digital content 106 as specified by a DRM policy 140, which is illustrated as embedded as part of the content.

The DRM module 134 is representative of functionality to control implementation of the DRM policy 140 as implemented at least partially in hardware of the computing device 102, e.g., processing system and computer-readable storage medium. In one or more implementations, the DRM module 136 is also embedded as part of the digital content 106 although it is illustrated separately in this example. The DRM module 134 is configured to determine traits of a behavior of a user that is to interact with the digital content 106 and provide access to portions 136, 138 of the digital content 106, if any, that correspond to those traits. For example, the DRM policy 140 may specify different backgrounds of an advertisement for different behaviors. Accordingly, the DRM module 134 determines traits of a user's request for access and provides access to corresponding portions of the digital content 106, e.g., the backgrounds, as specified by the DRM policy 140. In this way, the DRM policy 140 serves as a basis for creation of the digital content 106 and management of access to portions of the digital content 106 as further described in relation to FIGS. 2-4.

The DRM module 134 may leverage data obtained from a variety of different sources to determine user traits. This includes sources that are available via the network 142, the computing device 102 itself, a wearable or other peripheral device communicatively coupled to the computing device 102, and so forth. An example of creation and use of the DRM module and DRM policy is described in the following section.

DRM Policy and Module Creation

Figure 2:
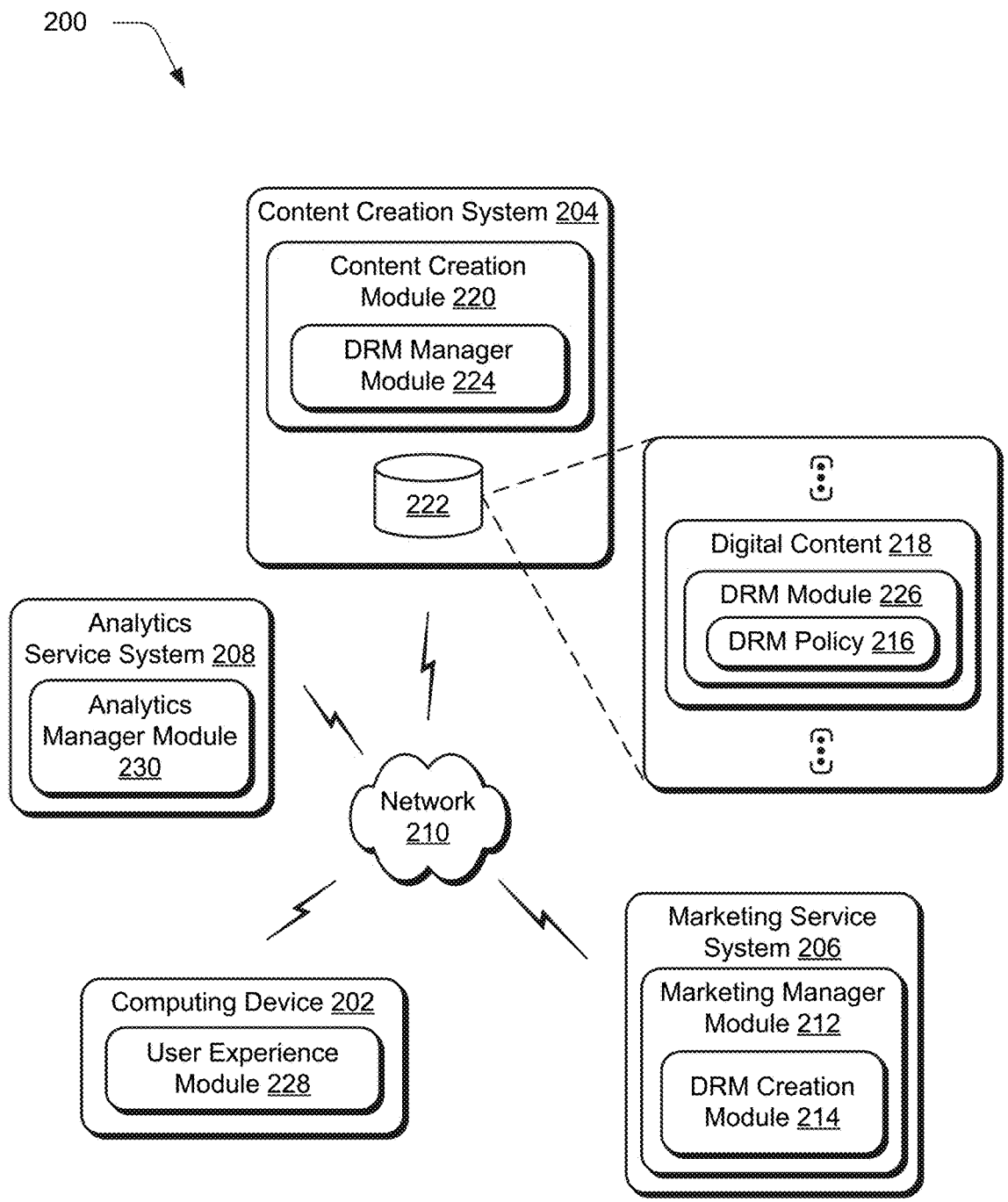
FIG. 2 is an illustration of an environment in an example implementation that is operable to employ digital rights management (DRM) and behavioral trait techniques described herein as within an augmented or virtual reality environment through embedding of a digital rights management module.

FIG. 2 is an illustration of an environment 200 in an example implementation that is operable to employ digital rights management and behavioral trait techniques described herein. The illustrated environment 200 includes a computing device 202 configured for use by a user as part of an augmented or virtual reality environment, such as computing device 102 of FIG. 1. The environment 200 also includes a content creation service system 204, a marketing service system 206, and an analytics service system 208 that are communicatively coupled, one to another, via a network 210. Each of these entities may be configured in a variety of ways using one or more computing devices.

The marketing service system 206 is illustrated as including a marketing manager module 212. The marketing manager module 212 is representative of functionality to support user interaction to create a marketing campaign, track deployment of the marketing campaign, and so forth. A user, for instance, may interact with the marketing manager module 212 to specify a marketing campaign, portions of content to be included in the campaign, and one or more behaviors of the campaign. The user may also interact with a DRM creation module 214 that is representative of functionality to specify traits of behaviors to form a DRM policy 216 to be utilized to manage access to content 218. The campaign, for instance, may be configured to control output of different images as a background based on age of users that access the content. Other examples of creation of the DRM policy 216 are also contemplated that do not involve marketing, such as to control access to portions of the digital content 218 within an office environment as further described below.

The marketing manager module 212 may employ analytics to generate analytics data (i.e., "big data") that describes a user population, such as traits of behaviors as described above. Through interaction with the marketing manager module 212, a user may then select traits of behaviors of a target population from this data that are to be met by users to consume corresponding portions of content 218. For example, the marketing manager module 212 may output a user interface via which a user may select traits of behaviors for a desired target population (e.g., age, gender, job title), such as by selecting a check box, keyword input, and so forth. In this way, the user is provided with detailed knowledge of traits of behaviors of a target population and from this knowledge selects traits of behaviors to be met to consume particular portion of the digital content 218, rather than guessing which traits could be met by a target population as performed in conventional techniques which may be prone to error and inefficient.

Data describing the digital content 218 to be created and the traits specified above as part of creation of the DRM policy 216 through interaction with the DRM creation module 214 is then provided to a content creation service 104 in this example. The content creation service system 204 includes a content creation module 220 that is representative of functionality to create digital content 218 (also referred to as "content" in the following), which is illustrated as stored in storage 222. A variety of digital content 218 may be created, such as webpages, advertisements, media including video and/or audio content, and so forth.

Continuing with the previous example, a user interacts with the content creation module 220 to create digital content 218 having characteristics as specified by the marketing service system 206. In this example, a DRM manager module 224 is used to embed a DRM module 226 as part of the content 118. Other examples are also contemplated as shown in relation to FIG. 12. The DRM manager module 224 is representative of functionality to control implementation of the DRM policy 216 as part of the content 218 during consumption of the content 218, e.g., by a user experience module 228 of the computing device 202 to support an augmented or virtual reality environment as further described below.

The DRM module 226 is configured to determine traits of a user that requests access to the content 218 and provide access to portions of the content 218, if any, that correspond to those traits. For example, the DRM policy 216 may specify different backgrounds of an advertisement for different behaviors. Accordingly, the DRM module 226 determines traits of a user's request for access and provides access to corresponding portions of the digital content 218, e.g., the backgrounds. In this way, the DRM policy 216 as specified by the marketing service system 206 serves as a basis for creation of the content 218 and management of access to portions of the digital content 218.

The DRM module 226 is configured to leverage data obtained from a variety of sources to determine traits associated with a user in order to control access. This includes sources that are available via the network 210 (e.g., a social network service), the computing device 202 itself, a wearable or other peripheral device communicatively coupled to the computing device 202, and so forth. An example of one such source is illustrated as an analytics service 208 having an analytics manager module 230 that is representative of functionality to collect analytics data. This may include analytics data such as social network posts, webpages visited, items bought and so forth that is exposed via application programming interfaces by websites. This may also include tracking code that is embedded as part of content that exposes data describing usage of the content. Thus, the "big data" collected by the analytics service 208 from third-party sources may describe the user and content usage of the user which may then be used by the DRM module 226 to control interaction with the content 218 as further described below. In this example, the DRM module 226 and corresponding DRM policy 216 are embedded as part of the digital content. Other examples are also contemplated in which the DRM module is not embedded as part of the digital content 218, but is still used to manage access according to the DRM policy as further described in the following and shown in a corresponding figure.

Figure 3:
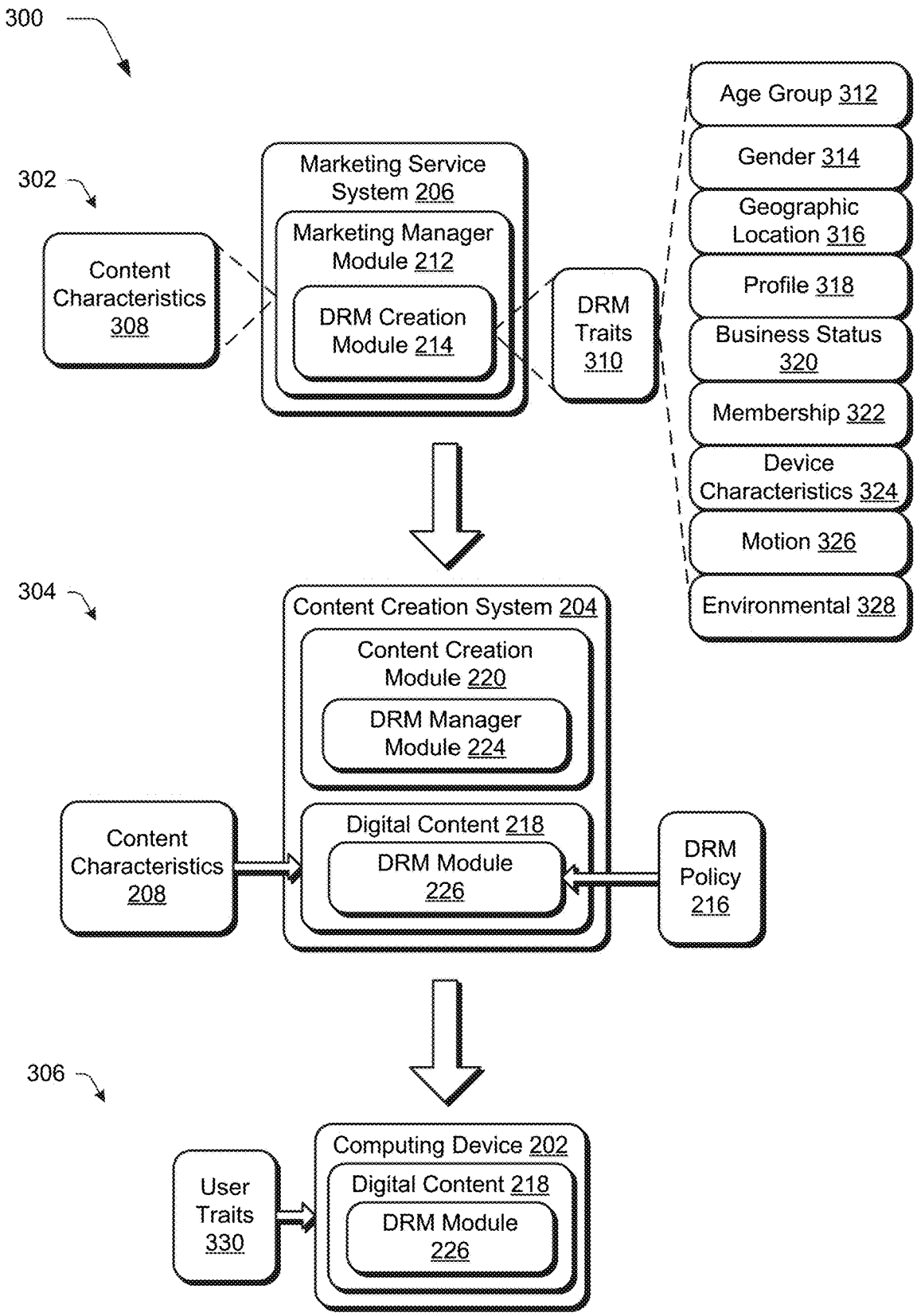
FIG. 3 depicts a system in an example implementation of creation of a DRM policy and subsequent digital content to be consumed by users included in a behavior.

FIG. 3 depicts a system 300 in an example implementation of creation of a DRM policy 216 and subsequent digital content 218 to be consumed by users included in a target segment. The system 300 is illustrated using first, second, and third stages 302, 304, 306. At the first stage 302, user interaction with a marketing manager module 212 is used to specify content characteristics 308, e.g., for part of a marketing campaign. A variety of different content characteristics 308 may be specified, including type of content such as webpage, printed ad, audio such as a jingle or song, video such as an instructional product video or dedicated product advertisement, legal contract. The content is also deliverable in a variety of ways, e.g., streaming or downloaded for local storage and subsequent playback.

The marketing manager module 212 as previously described may also include a DRM creation module 214. The DRM creation module 214 in this instance is representative of functionality to specify digital rights management (DRM) traits 310 of behaviors that are used to create a DRM policy 216 of the content creation system 104. The DRM policy 216 as previously described is configured to control content access by determining which traits of users are satisfied in order to gain access to portions of content. As described above, the DRM traits may be specified in a variety of ways, such as through selection of particular traits collected through analytics by the marketing service system 206.

A variety of different DRM traits 310 may be specified, such as traits particular to a behavior but are not unique to individual members having the behavior, e.g., may be satisfied by a plurality of users. Examples of such traits that are usable to determine potential interaction of a user with content include age group 312 (e.g., particular age or age range), gender 314, geographic location 316 (e.g., based on IP address, city, state, region, country, continent), organizational associations such as profile 318 (e.g., traits included in a social network profile, business title in a business website, educational degrees achieved, particular skills), business status 320 (e.g., whether an associated business is in good standing, business certifications), group membership 322 (e.g., membership to a particular organization), and other traits such as device characteristics 324 of a device being used by the user to gain access (e.g., brand, hardware resources, software resources, display resources), and temporal traits (e.g., business hours, time of day, day of week, week of month, year). Additional examples of traits include motion 326 (e.g., motion exhibited by a user or a device making a request), environmental 328 (e.g., a user's surrounding or biometric to describe the user), and so forth.

At the second stage 304, a content creation module 220 of the content creation system 204 is used to create digital content 218 and a DRM module 226 to control access to the digital content 218 as specified by a DRM policy 216 created based on the specified DRM traits 310. A creative professional, for instance, may interact with the content creation module 220 of the content creation service 204 to create digital content 218 as specified by the content characteristics 308 received from the marketing service system 206. The marketing service system 206, for instance, may specify different images and the content characteristics 308 thereof to be used as alternatives as part of a marketing campaign based on the DRM traits 310. The creative professional may then create digital content 218 as specified.

The content creation module 216 also includes a DRM manger module 224 that is representative of functionality that is configured to implement the DRM policy 216 through embedding the DRM module 226 as part of the digital content 218. The DRM module 226, for instance, may be executable to determine DRM traits 310 associated with consumption of the digital content 218. As described above, these may include DRM traits 310 of a behavior that are not specific to a particular user, including traits of a device used, age group, geographic location, and so forth.

Figure 12:
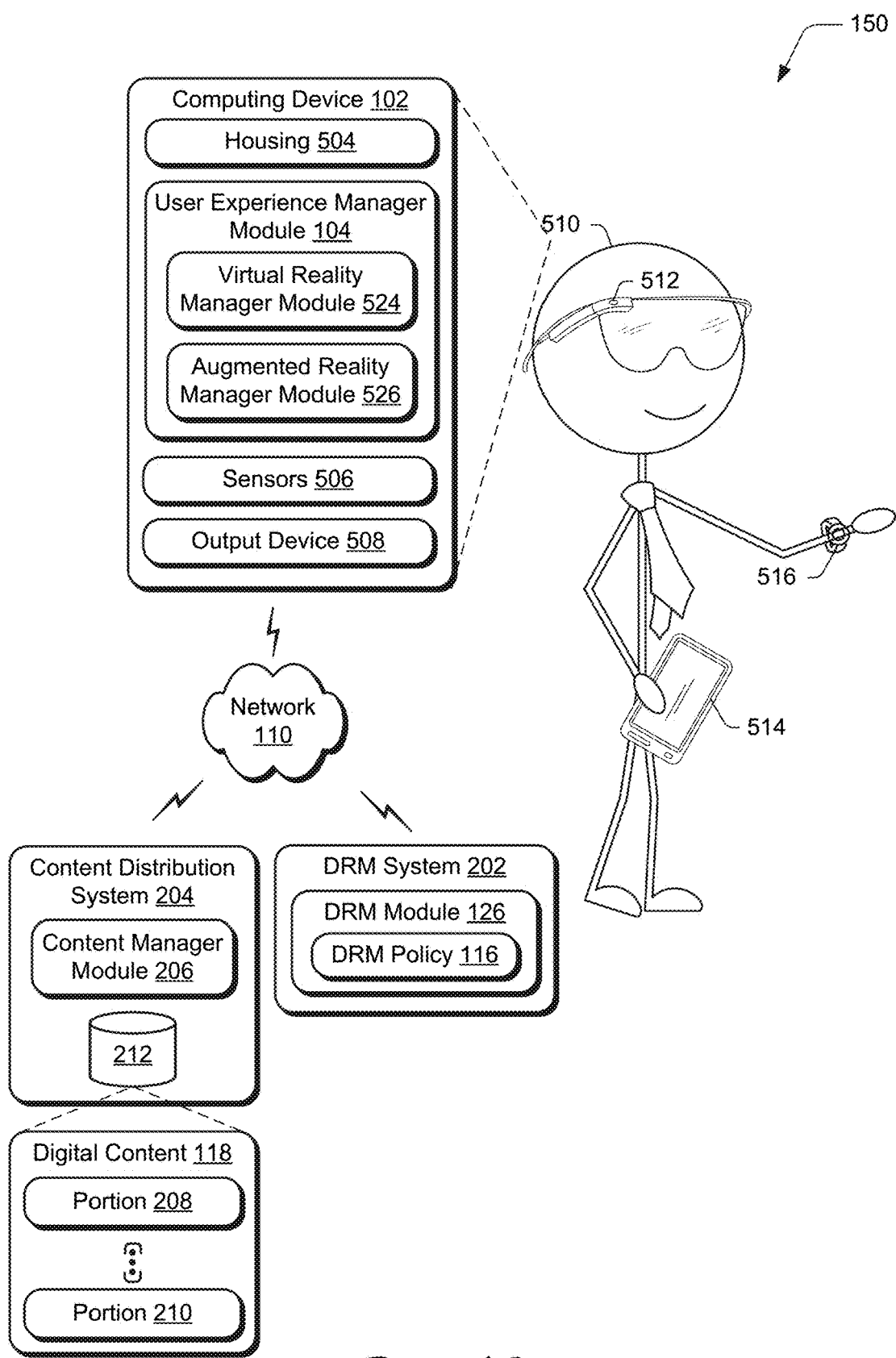
FIG. 12 is an illustration of an environment in an example implementation that is operable to employ digital rights management (DRM) and behavioral trait techniques described herein as part of an augmented or virtual reality environment in which digital rights management is performed by a DRM system to control streaming of portions of digital content.

Accordingly, the content 218 having the DRM module 226 may be provided to a computing device 202 for consumption as shown at the third stage 306. The DRM module 226 may then be utilized to address differences in traits between users, such as gender 312. The DRM module 226 is also usable to address changes in the user, itself, such as change in age group 312, geographic location 316, business status 320 (e.g., job title), membership 322, motion 326, an environment 328 in which the user is located, and so on and may continue to address these changes as they happen. Further, this dynamic consumption may be performed offline without accessing a network as the DRM module 226 is embedded as part of the digital content 218, and thus may address limitations of conventional techniques that required access in order to serve different content, such as targeted advertisements as part of webpages that are obtained and not available locally until relevant characteristics of a user are determined. In this way, the DRM module 226 may compare user traits 330 to the DRM traits 310 to determine which traits are met and control access to corresponding portions of digital content 218. This may also be performed remotely by the DRM module 226 as shown in FIG. 12.

Figure 4:
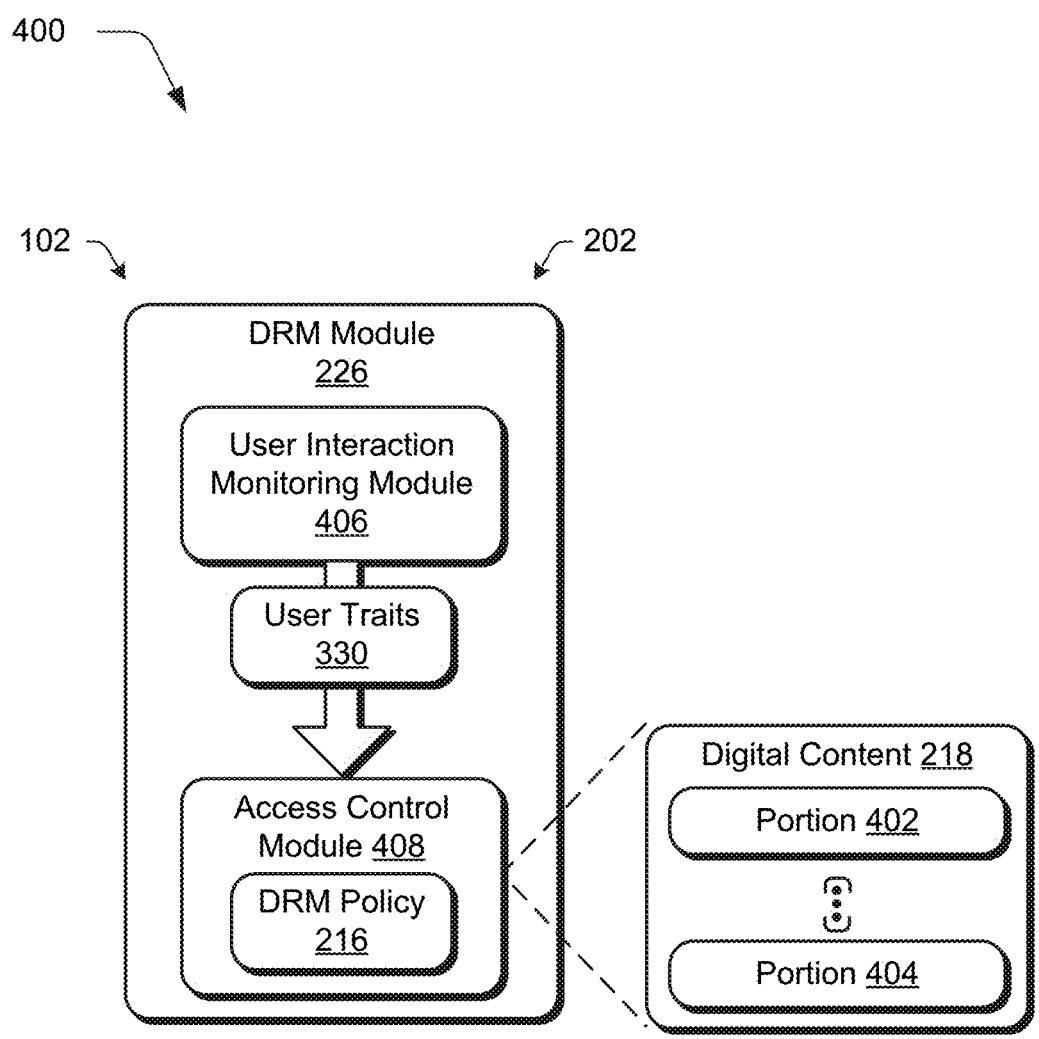
FIG. 4 depicts a system in an example implementation in which a DRM module is used to monitor interaction to identify DRM traits and control access to portions of content as traits are identified.

FIG. 4 depicts a system 400 in an example implementation in which the DRM module 226 is used to monitor interaction to identify DRM traits and control access to portions 402, 404 of digital content 218 as user traits 330 are identified. The DRM module 226 as previously described may be employed locally by the computing device 102 as embedded as part of the digital content 218.

The DRM module 226 is configured to implement a DRM policy 216. To do so in this example, the DRM module 226 includes a user interaction monitoring module 406 that is configured to monitor user interaction to identify user traits 330 as part of this interaction. The user traits 330, for instance, may describe traits learned through interaction with portions 402, 404 of the digital content 218 itself. A user, for instance, may interact with a portion of digital content 218 and as part of that interaction, the user interaction monitoring module 406 may identify user traits 330. In another instance, the user may interact with other portions of the digital content 218, the computing device 102, other devices communicatively coupled to the computing device 102, network services (e.g., a social network service), and so on. User traits 330 that describe these other interactions that are performed independently of the digital content 218 may also be identified by monitoring this interaction. The access control module 408 is implemented to permit access to corresponding portions 402, 404 of the digital content based on these user traits 330 as defined by the DRM policy 216.

Digital Content and Digital Rights Management

Figure 5:
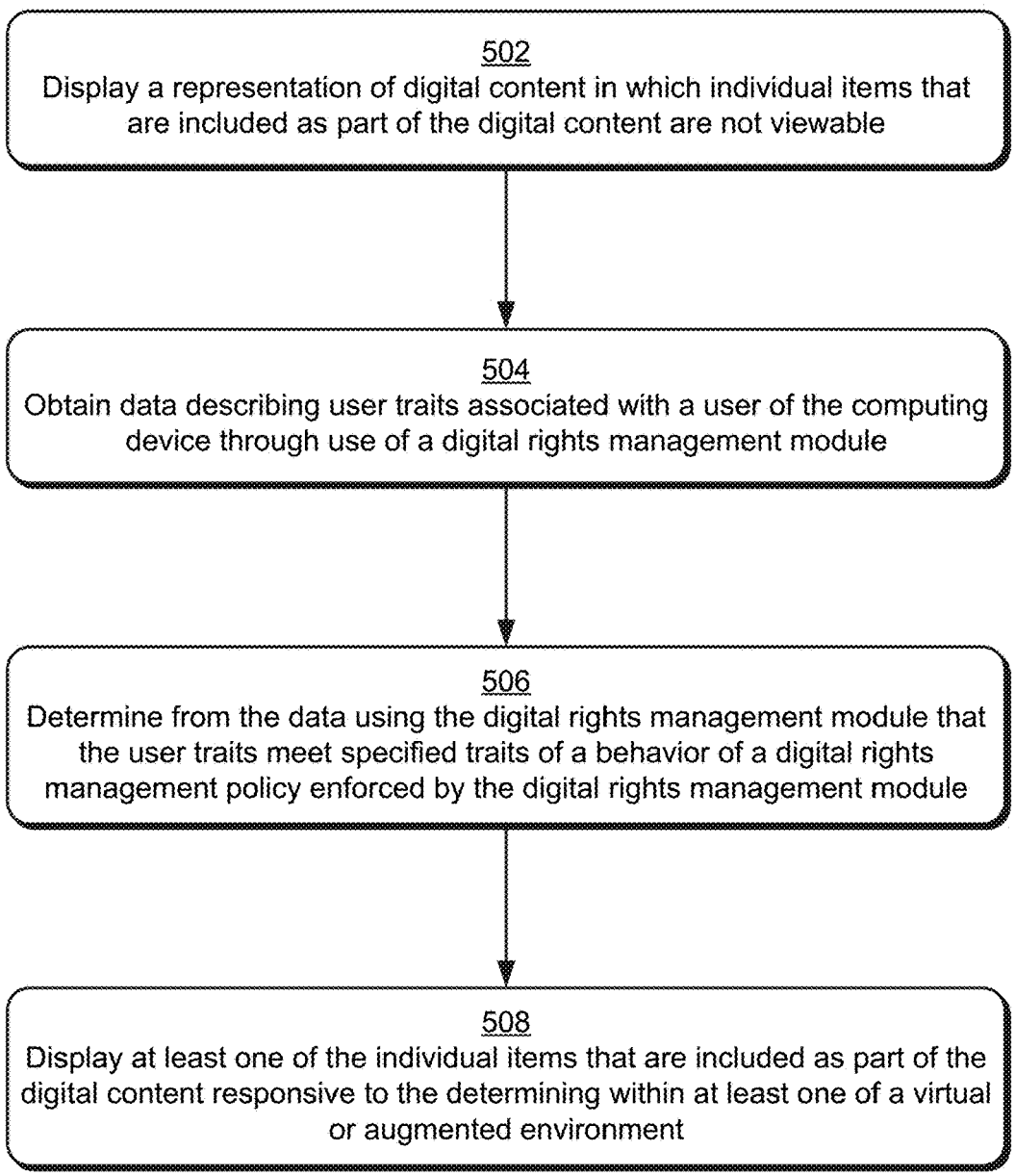
FIG. 5 is a flow diagram depicting a procedure in an example implementation in which digital content as part of an augmented or virtual reality environment is managed through use of a digital rights management module.
Figure 6:
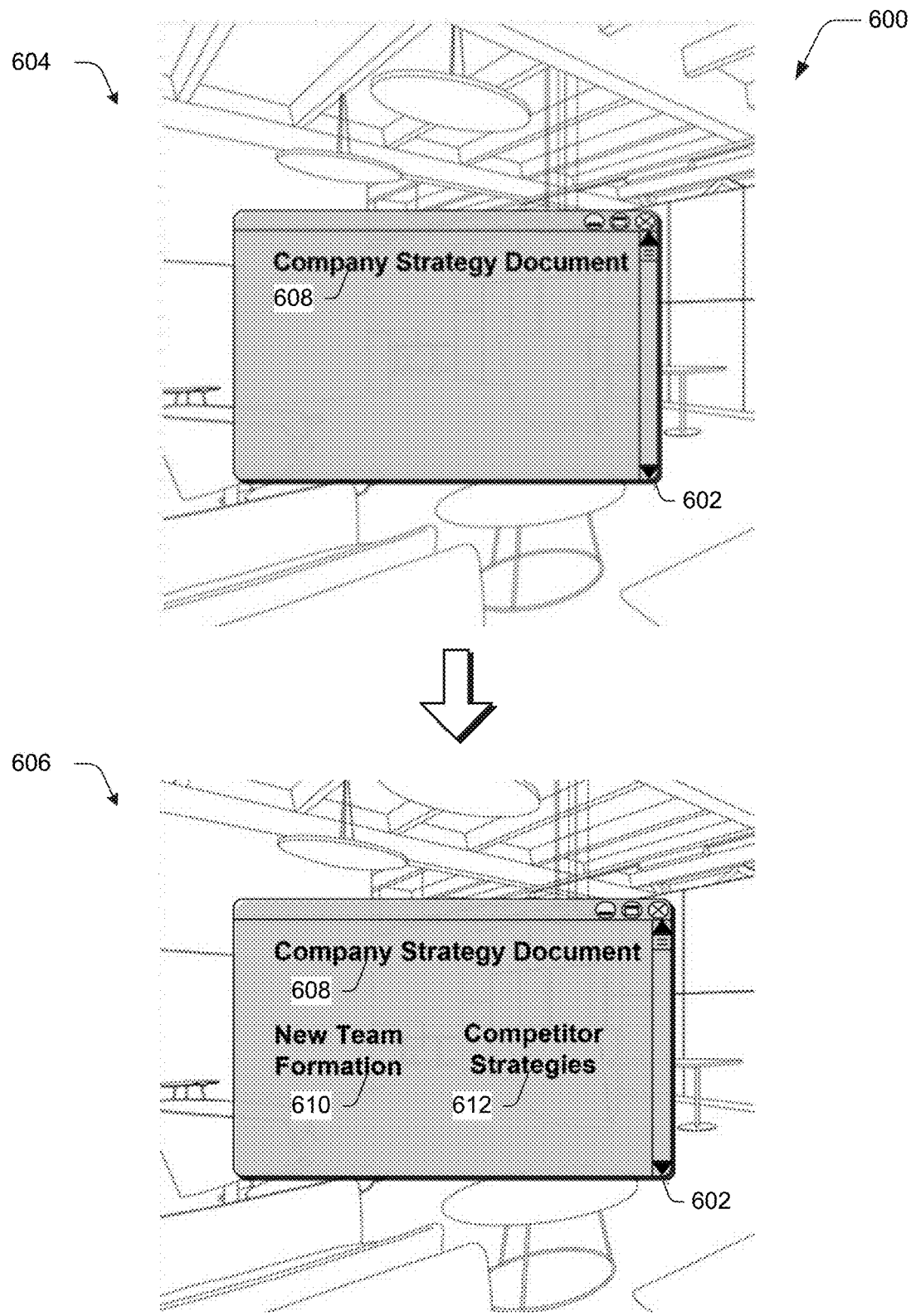
FIG. 6 depicts an example of a virtual or augmented reality environment that includes digital content.
Figure 7:
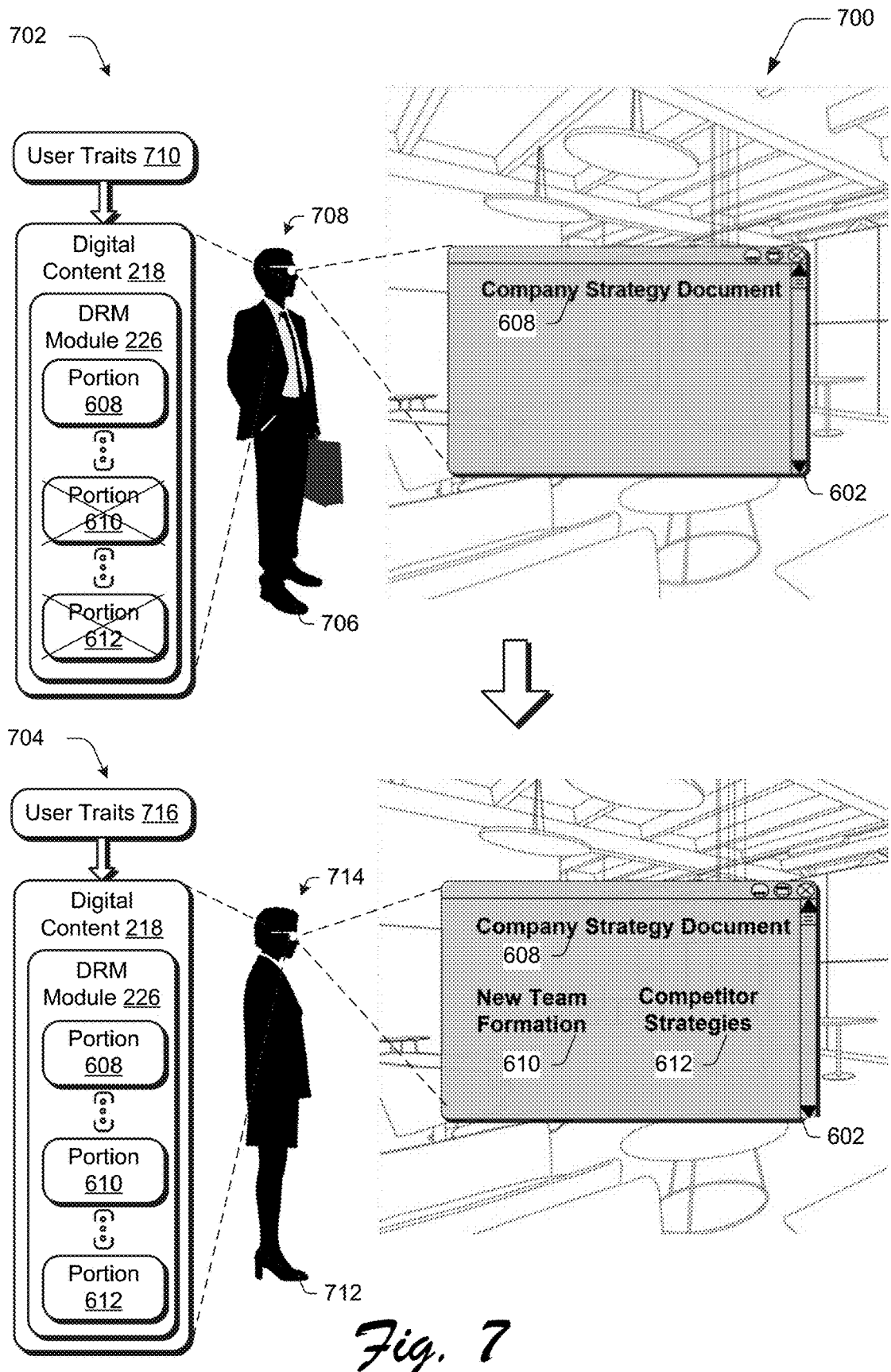
FIG. 7 depicts example of control of access to portions of the digital content of FIG. 6 through use of a DRM module.

FIG. 5 depicts a procedure 500 in an example implementation in which digital content is managed as part of an augmented or virtual reality environment through use of a digital rights management module. FIG. 6 depicts an example 600 of a virtual or augmented reality environment that includes digital content. FIG. 7 depicts example 700 of control of access to portions of the digital content of FIG. 6 through use of a DRM module.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeable to FIGS. 5-7.

A representation of digital content is displayed in which individual portions that are included as part of the digital content are not viewable (block 502). The representation, for instance, may be configured as an icon (e.g., a file or folder), a window, a virtual viewport, and so forth within a virtual or augmented reality environment. Thus, the representation is configured to indicate existence of the digital content as part of the environment but does not give access to individual portions of the digital content, e.g., text of an article, pictures, and so forth.

Data is obtained that describes user traits associated with a user of the computing device through use of a digital rights management module (block 504). The data may be obtained from a variety of different sources. As previously described, this data describes traits of a population that is to consume the data, but is not particular to any particular user, e.g., such as via a user name and password. Examples of user traits 330 include age group 312, gender 314, geographic location 316, profile 318 (e.g., job title), business status 320, membership 322, device characteristics 324, motion 326, an environment 328 in which the user is located, and so on as described in FIG. 3. Further, this data may be updated in real time as changes to the user traits occur, e.g., to move from one geographic location 316 to another, change in age group 312, and so forth.

A determination is made from the data using the digital rights management module that the user traits meet specified traits of a behavior of a digital rights management policy enforced by the digital rights management module (block 506). The user traits 330, for instance, are compared by the DRM module 226 to DRM traits 310 specified as part of the DRM policy 216. Based on this, it may be determined whether the user traits 330 meet the DRM traits 310, regardless of an actual identity of the user.

At least one of the individual portions are displayed that are included as part of the digital content responsive to the determining within at least one of a virtual or augmented environment (block 508). Continuing with the previous example, the determination made by the DRM module 226 as to whether the user traits 330 meet the DRM traits 310 of the DRM policy 216 is then used to control which portions 402, 404 of the digital content 218 are exposed to a respective user. Thus, in this example by default the user 116 is not exposed to portions 402, 404 of the digital content 218 until this determination is made.

As shown in FIG. 6, for instance, a representation 602 of digital content 218 is shown as part of a virtual or augmented reality environment at a first stage 604. The representation 602 is configured as a window via which the digital content 218 is to be viewed, but does not permit access to at least one of the portions of the digital content 218. In this way, the digital content 218 is represented as part of the virtual or augmented reality environment as shown at the first stage 804, but access to these portions is restricted.

This may be used to support a variety of functionality. For example, even though a user may not have access to portions within the digital content 218, the representation 602 may be used to position a location of the digital content within the virtual or augmented reality environment. A personal assistant, for instance, may organize and arrange the representations within the environment without having access to the portions by viewing the title 608 of the digital content but not having access to portions within a body of the content. Further, this access may dynamically evolve as more is learned about the user as further described below.

Access may then be granted to users by the DRM module 226 based on the DRM policy 216. As shown at a second stage 606, for instance, the representation of the digital content 602 includes the title 608 as before. This output is provided initially to users as part of an augmented or virtual reality environment. Upon determining that user traits 330 of a respective user do comply with the DRM policy 216, access to portions 610, 612 of the digital content 218 is permitted. In this way, the DRM module 226 may by default restrict access to the portions of the digital content 218.

The DRM module 226 may then permit access once the DRM traits 310 as specified by the DRM policy 216 are met, which may evolve as the user traits 330 evolve and thus may dynamically address changes in the user. The user, for instance, may obtain a promotion (e.g., profile 318) that permits such access, as verified by a centralized system of the business, which was not possible without this promotion. Further, this access may evolve without making changes to the digital content 218 itself through use of the DRM module 226. The DRM module 226 may also be used to dynamically control access by different users having different user traits 330, an example of which is described in the following.

FIG. 7 depicts an example 700 of use of DRM module 226 to control access to portions of digital content 218 within a virtual or augmented reality environment for different users having different user traits. This example is shown using first and second stages 702, 704. At the first stage 702, a user 706 interacts with a computing device 708 (e.g., which may correspond to computing device 102 or computing device 202) as part of a virtual or augmented reality environment. User traits 710 are collected by the DRM module 226 embedded as part of the digital content 218 to control access to individual portions 608, 610, 612. In this example, the user traits 710 do not meet the traits of a DRM policy implemented by the DRM module 226 for access to portions 610, 612, but do permit access to portion 608. The user 706, for instance, may have a profile 318 as "personal assistant" defined as part of the user traits 710. Accordingly, the user 706 is not given access to portions 610, 612 because the user traits 710 (e.g., profile 318) do not meet the traits of behaviors defined for those portions 610, 612. Access, however, is permitted by the DRM module 226 to portion 608, e.g., a title of the document that forms the digital content 218.

In this way, the user 706 as a personal assistant may interact generally with the digital content globally and as a whole, e.g., to reposition the digital content 218 through interaction with the representation 602 within the virtual or augmented reality environment. However, the user 706 is not granted access to potentially sensitive portions 610, 612 that relate to new team formation and competitor strategies.

A second user 712, on the other hand as shown at the second stage 704, through use of a corresponding computing device 714 does have user traits 716 that permit access to each of the portions 608, 610, 612. The second user 712, for instance, may also interact with a virtual or augmented reality environment using the computing device 714. As part of this interaction, user traits 716 are also collected by the DRM module 226 that is embedded as part of the digital content 218.

The user traits 716 in this instance indicate that the user 712 has a profile 318 of "Board Member". As a result, the DRM module 226 permits access to portion 608 involving the title of the document as well as portions 610, 612 which involve new team formation and competitor strategies, respectively. Accordingly, the user 712 in this instance is permitted access to this sensitive information via portions that are included as part of the digital content 218, as well as may interact with the digital content 218 as a whole, e.g., to reposition, move, open, close, and other interaction involving the representation 602 of the content. In this way, a single instance of digital content 218 is provided to multiple users, access to portions of which is controlled by the digital content 128 itself through use of the DRM module 226.

In this example, the DRM module 226 is embedded as part of the digital content 218 to control interaction with portions as part of a virtual or augmented reality environment. The DRM module 226 may also be implemented separately apart from the digital content 218 as described in relation to FIG. 12 and as further described in the following.

Digital Content and Control of Interaction with Physical Objects

Figure 8:
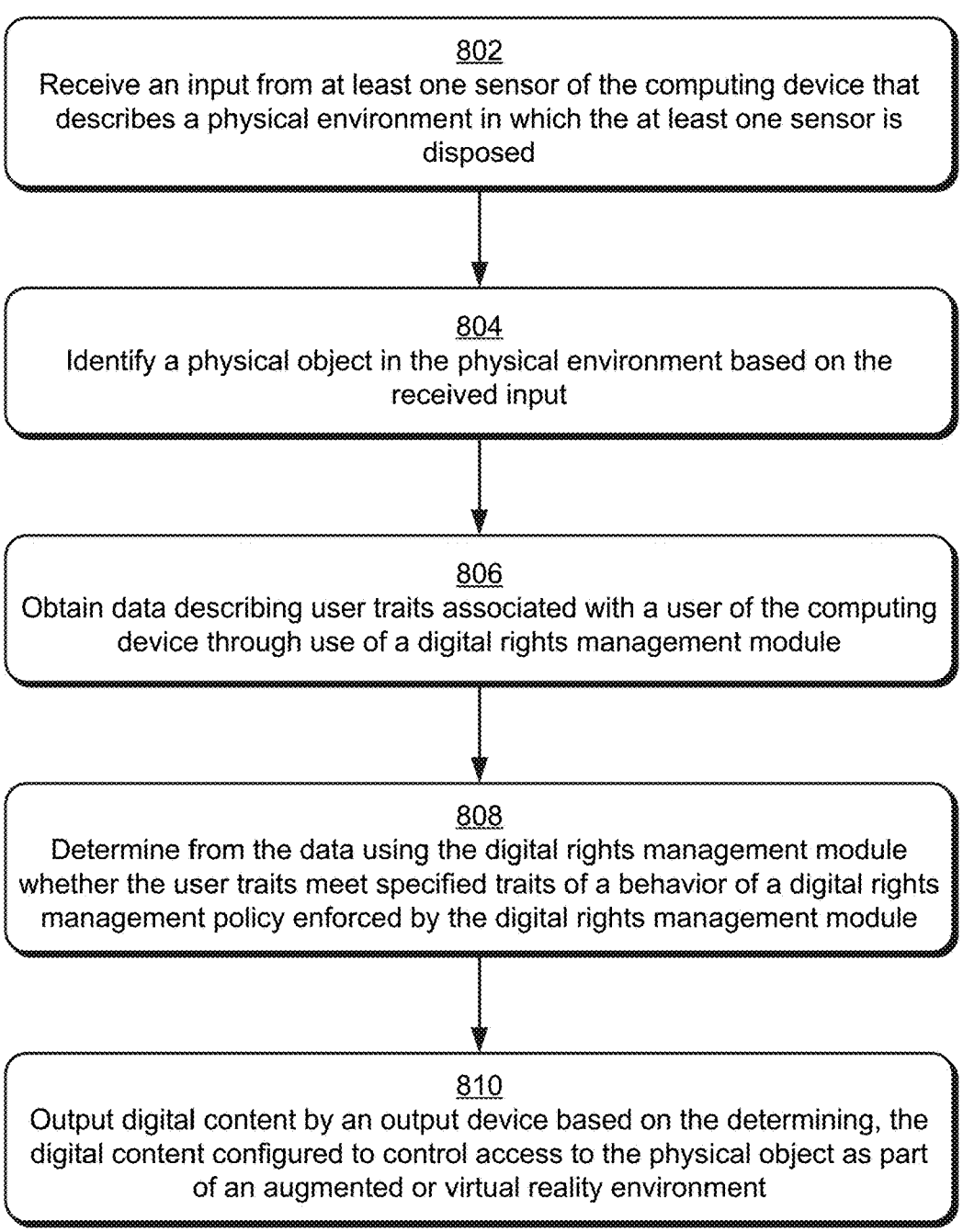
FIG. 8 is a flow diagram depicting a procedure in an example implementation in which digital content is managed through use of a digital rights management module to control access to a physical object as part of an augmented or virtual reality environment.
Figure 9:
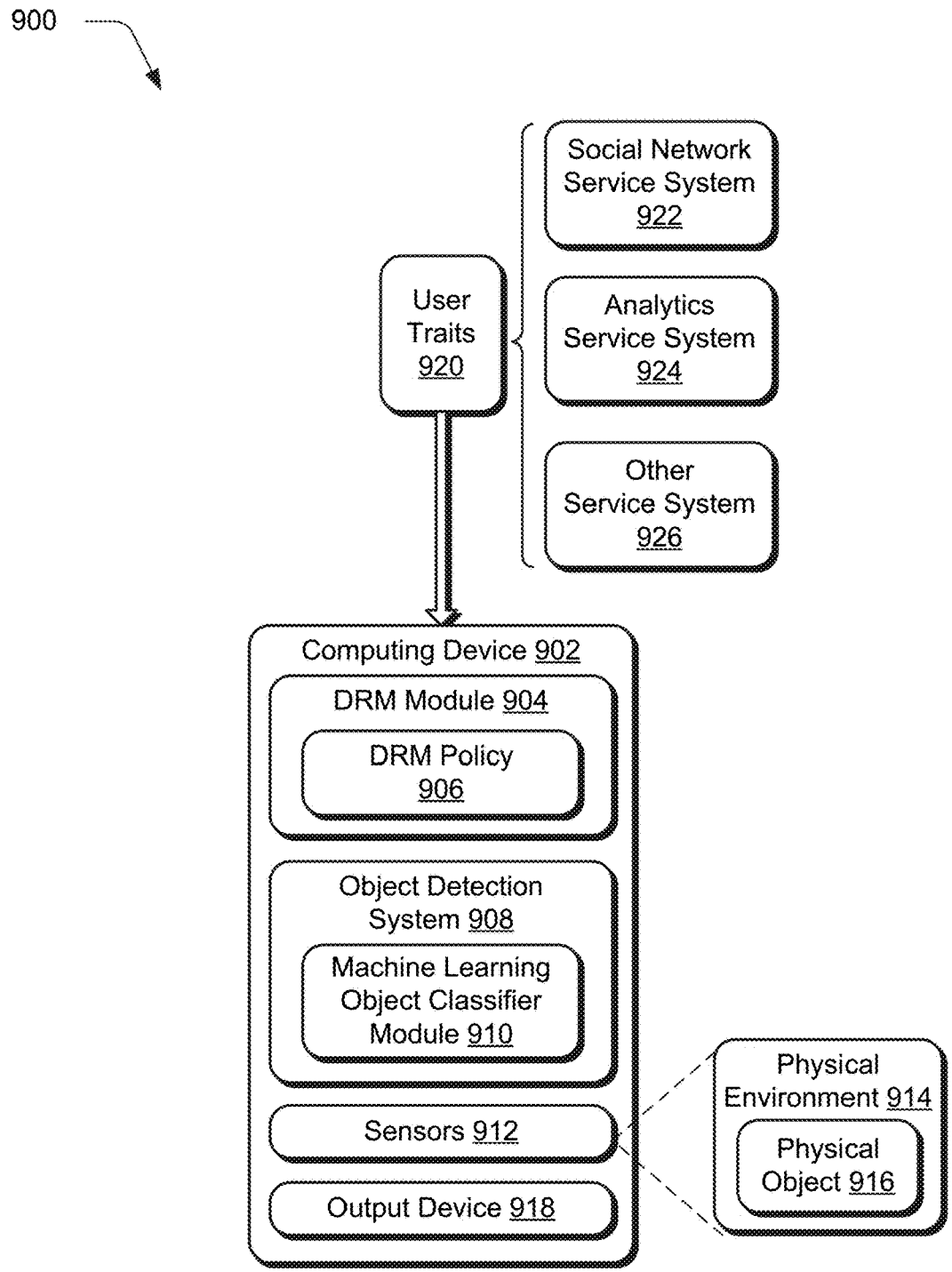
FIG. 9 depicts a system in an example implementation in which user traits are collected and used as a basis for control of interaction with physical objects as part of a virtual or augmented reality environment.
Figure 10:
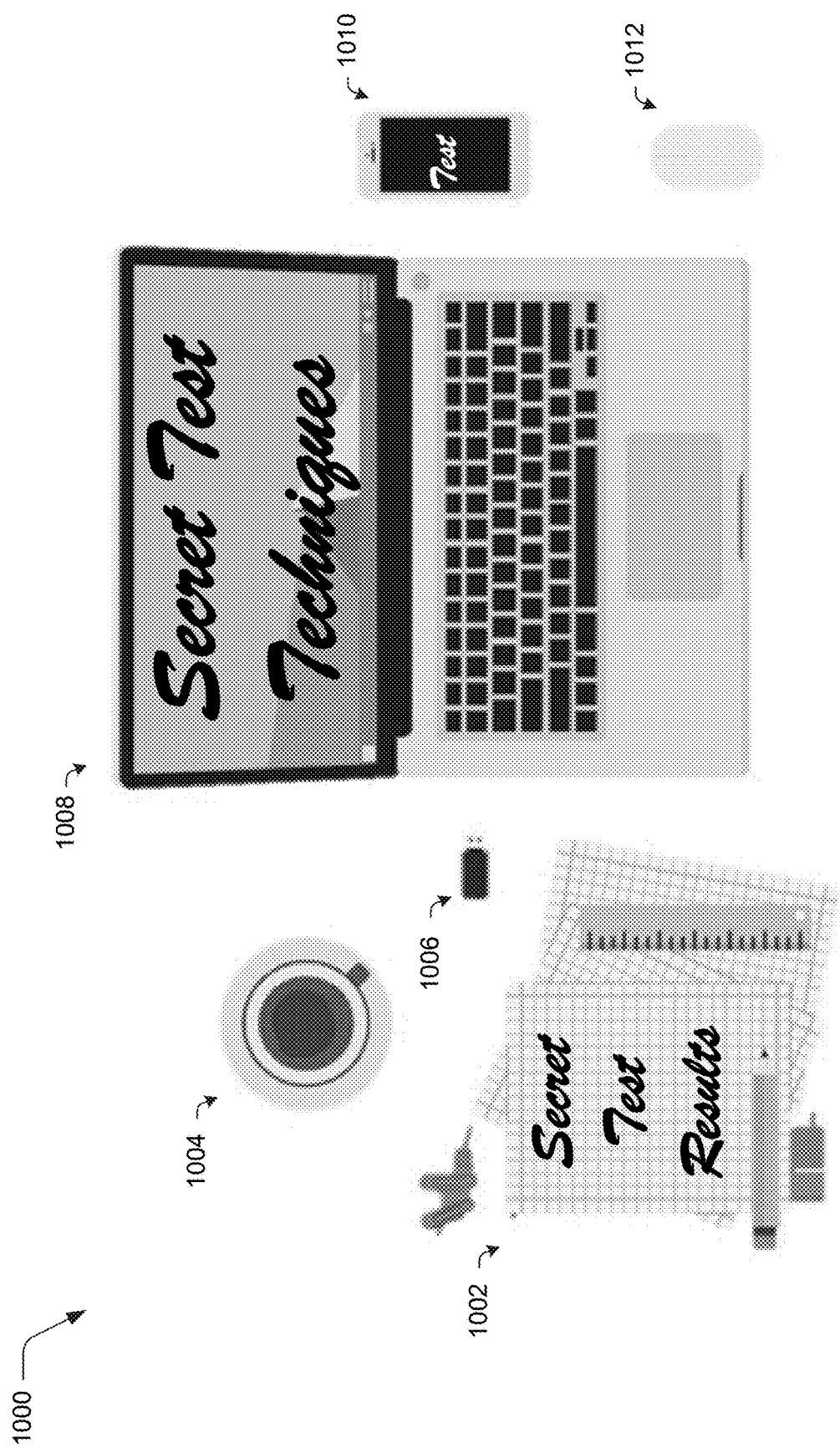
FIG. 10 depicts an example of a view of physical objects in a physical environment.
Figure 11:
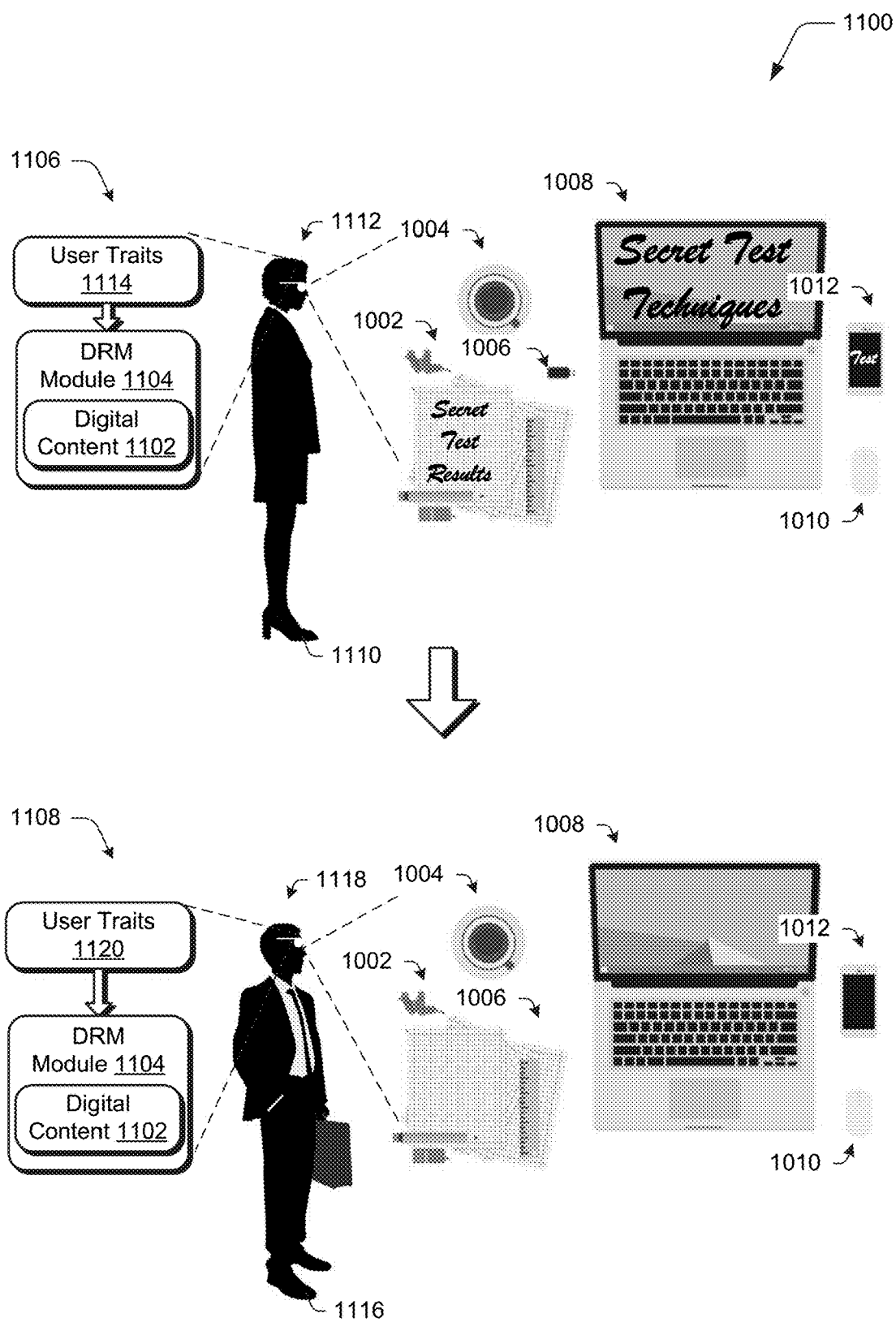
FIG. 11 depicts examples of use of digital content to control a view of the physical objects as part of a virtual or augmented reality environment.

FIG. 8 depicts a procedure 800 in an example implementation in which digital content is managed through use of a digital rights management module to control access to a physical object as part of an augmented or virtual reality environment. FIG. 9 depicts a system 900 in an example implementation in which user traits are collected and used as a basis for control of interaction with physical objects as part of a virtual or augmented reality environment. FIG. 10 depicts an example 1000 of a view of physical objects in a physical environment. FIG. 11 depicts an example implementation 1100 of use of digital content 218 to control a view of the physical objects as part of a virtual or augmented reality environment.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeable to FIGS. 8-11.

In the previous example, the DRM module 226 is used to control access to portions 402, 404 of digital content 218. In this example, the DRM module 226 and the digital content 218 are used to control access to physical objects within a physical environment in which a user is disposed as part of a virtual or augmented reality environment. For example, suppose a user wears augmented reality goggles and thus is able to directly see physical objects in an augmented reality environment. The DRM module 226, through use of digital content 218, may control access to potentially sensitive information as part of those physical objects, such as to obscure text on a document, a view of a computer screen, an ability to hear another conversation or other audio output within the environment, and so forth.

To begin, an input is received from at least one sensor of the computing device that describes a physical environment in which the at least one sensor is disposed (block 802). As shown in FIG. 9, for instance, a computing device 902 includes a DRM module 904 to implement a DRM policy 906. The computing device further includes an object detection system 908 having a machine learning object classifier module 910, sensors 912 configured to detect a physical environment 914 and physical object 916 within the physical environment 914, and an output device 916. This may include a layout of the physical environment 914, where physical objects 916 are located in this physical environment 916, and so forth.

A physical object 916 is then identified in the physical environment based on the received input (block 804). The computing device 902, for instance, may include an object detection system 908 that is configured receive inputs form the sensors 912. From these inputs, the object detection system 908 identifies physical objects 916 included in the physical environment 914. In one example, this is performed by a machine learning object classifier module 910. This module is implemented at least partially in hardware to employ machine learning (e.g., neural networks) to identify physical objects 910 within the physical environment, such as paper, a computer, and so forth. This may also be used to identify "what" is included as part of these physical objects 916, e.g., images, text, graphs, and so forth disposed on a surface of the physical objects 916 through optical character or object recognition.

Data is obtained that describes user traits associated with a user of the computing device through use of a digital rights management module (block 806). As before, user traits 920 may be obtained from a variety of different sources, such as from the computing device 902 itself, a social network service system 922, analytics service system 924 or other service system 926. A determination is then made from the data using the digital rights management module whether the user traits meet specified traits of a behavior of a digital rights management policy enforced by the digital rights management module (block 808). For example, data describing physical objects 916 identified by the object detection system 908 is provided to the DRM module 904. The DRM module 904 may then utilize a DRM policy 906 as above based on a determination of whether user traits of a behavior meet specified traits of a behavior of the DRM policy 906. In this example, however, the DRM policy 906 specifies permissible and/or restricted access to physical object as part of a virtual or augmented reality environment.

To do so, digital content 218 is output by an output device based on the determination. The digital content 218 is configured to control access to the physical object 916 as part of an augmented or virtual reality environment (block 810). The digital content 218, for instance, may be configured to block a view of the physical object, interfere with audio output in a physical environment, and so on through use of the digital content 218 or portions 402, 404 of the digital content.

FIG. 10 depicts an example implementation of a physical environment 1000 in which a user is disposed as part of a virtual or augmented reality environment. The physical environment includes example of physical object including paper 1002, a coffee cup 1004, a thumb drive 1006, a laptop 1008, a mobile phone 1010, and a mouse 1012. As illustrated, some of the physical objects include potentially sensitive material, such as secret test results on the paper 1002, secret test techniques as displayed by the laptop 1008, and a test as displayed by the mobile phone 1010. The DRM module 226 in this instance is configured to control access to particular items of these physical objects as part of a virtual or augmented reality environment, an example of which is described as follows.

FIG. 11 depicts an example implementation 1100 of use of digital content 1102 by a DRM module 1104 to control access to physical objects as part of an augmented or virtual reality environment. This implementation 1100 is shown using first and second stages 1106, 1108. At the first stage 1106, a first user 1106 is illustrated as viewing the physical environment 1000 of FIG. 10 through a computing device 1112. The DRM module 1104, as described in relation to FIG. 9, employs an object detection system 908 and machine learning object classifier module 910 to detect and recognize the physical objects 916, including the paper 1002, coffee cup 1004, thumb drive 1006, laptop 1008, mobile phone 1010, and mouse 1012.

Based on this, the DRM module 1104 controls an output of digital content 1112 to control access to the physical objects. For example, the DRM module 1104 may determine from user traits 1114 of the user 1110 that access it to be permitted. In response, the DRM module 1104 permits a direct physical view of the physical objected in an augmented reality environment or recreates an entirety of an appearance of the physical objects in a virtual reality environment, e.g., such that the text on the paper 1002, screen of the laptop 1008, and a display device of the mobile phone 1012 having the potentially sensitive material are viewable. For example, this physical environment 1000 of FIG. 10 may be the first user's 1110 office and therefore access is permitted to those physical objects. This may also be based on business title, membership, and a variety of other user traits as previously described.

At the second stage 1108, however, a second user 1116 is disposed within the physical environment 1000 of FIG. 10. In response, user traits 1120 of this second user 1116 are used to control what may be viewed by the user regarding these physical objects. In this example, for instance, the second user 1116 may be a personal assistant to the first user 1110. As such, user traits 1120 of this second user 1116 do not permit access to at least parts of the physical objects. For the paper 1002, for instance, the user may view the existence of the paper but portions of the digital content 1102 is used to obstruct a view of text on the paper 1002. This may be performed by recreating a background of "what would be behind" the text, e.g., through hole-filling image processing techniques, by "graying out" the area, addition of blur, and so forth. Similar techniques may also be used to obscure display devices of the laptop 1008 and mobile phone 1012. Thus, the second user 1116 may be made aware as to the existence of these objects, but is not made aware is to what is contained on the objects.

Existence of the physical objects may also be blocked. As shown for the second user 1116 at the second stage 1108, a view of the thumb drive 1006 is not included as part of the virtual or augmented reality environment. Thus, in this example a user may be able to actually touch the thumb drive 1006, but is not able to view the thumb drive 1006 as part of the virtual or augmented reality environment.

Although view of physical objects was described in this example, control may also be managed using digital content 1102 for other senses. For example, the DRM module 1104 may permit or restrict a user 1116 from hearing audio, such as to prevent associated audio devices from output to the user, use of destructive audio waves (e.g., audio waves that are out of phase 180 degrees with respect to the audio being obscured), introduction of noise, and so forth. Similar techniques may be used for tactile output, e.g., haptic feedback. The DRM module 1104 in this instance may be implemented in a variety of ways, such as embedded as part of the digital content 1102 as described in relation to FIG. 1 or remotely as part of a DRM system as described in the following.

DRM system to Control Streaming of Portions of Digital Content

FIG. 12 depicts an example environment 1200 in which a DRM module 1202 implement a DRM policy 1204 by a digit rights management system 1206 to manage access to portions 1208, 1210 of digital content 1212. The computing device 1214 (which may or may not correspond to computing devices 102, 202) in this example also includes a user experience manager module 1216 having virtual and augmented reality manager modules 1218, 1220, sensors 1222, and an output device 1224 for viewing by a user 1226.

In this example, the DRM system 1206 is implemented remotely via the network 1228 from the computing device 1214 of the user 1226 to manage access of the user to portions 1208, 1210 of the digital content 1212 as specified by a DRM policy 1204. The DRM system 1206, for instance, may be implemented as part of a web service by one or more computing devices "in the cloud" as described in relation to a platform of FIG. 13.

As before, the DRM policy 1204 specifies traits that, when met by user 1226 traits, are used to control access to corresponding portions 1208, 1210 of the digital content 1212 by the DRM module 1202. Although illustrated as part of the DRM system 1206, the DRM policy 1204 may be included as part of the digital content 1212 and previously described in relation to FIG. 1 but still permit remote control of access to the portions 1208, 1210 of the digital content 1212 by the DRM system 1206.

The DRM module 1202 is configured to collect data describing these user traits from a variety of sources. In one example, data is received by the DRM module 1202 via the network 1228 from sensors 1222 of the computing device 1214 that describe the user traits as described in relation to FIG. 4. The user traits described in this data is then analyzed by the DRM module 1202 and used to control access to corresponding portions 1208, 1210 of the digital content 1212.

The DRM module 1202, for instance, may communicate with a content distribution system 1228 (e.g., a web service system, website provider system) via the network 1228 to stream corresponding portions 1208, 1210 of the digital content 1212 for user 1226 interaction as part of a virtual or augmented reality environment. Functionality of the content distribution system 1228 may also be incorporated as part of the DRM system 1206 such that control and distribution of the digital content 1212 is performed by a single source. Data describing user traits may also be obtained from a variety of other sources, such as from an analytics service system as previously described in relation to FIG. 1, from a business entity system, from a social network system, and so forth.

Example System and Device

FIG. 13 illustrates an example system generally at 1300 that includes an example computing device 1302 that is representative of one or more computing systems and/or devices that may implement the various techniques described herein. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device having a hardware processor, computer-readable storage media and instructions stored on the computer-readable storage media and executable by the hardware processor, the method comprising:

obtaining, by the at least one computing device, data describing user traits of users responsive to requests received from the users to access digital content as part of an augmented or virtual reality environment;

determining, by the at least one computing device, from the data using a digital rights management module whether the user traits meet specified traits of a behavior of a digital rights management policy enforced by the digital rights management module;

responsive to the determining that the specified traits are met by a first set of the user traits, rendering, by the at least one computing device, a first portion of the digital content along with content of the augmented or virtual reality environment; and responsive to the determining that the specified traits are met by a second set of the user traits, rendering, by the at least one computing device, a second portion of the digital content along with the content of the augmented or virtual reality environment, the first set of the user traits and the second set of the user traits are mutually exclusive sets of the user traits.

2. A method as described in claim 1, wherein the specified traits of the behavior are not unique to the users.

3. A method as described in claim 1, wherein the digital rights management module is implemented by the at least one computing device as part of a digital rights management system that is accessible via a network to at least one other computing device that is configured to render the digital content as part of the augmented or virtual reality environment for viewing by the users.

4. A method as described in claim 3, wherein the data describing the user traits is obtained from the at least one other computing device.

5. A method as described in claim 3, wherein the data describing the user traits is obtained by the at least one other computing device from an analytics service provider via the network.

6. A method as described in claim 1, wherein the specified traits of the behavior include at least one of: age, gender, geographic location, membership in a particular organization, business status, job title, or characteristics of a device used to access the content.

7. A method as described in claim 1, wherein the first portion of the digital content is configured to control access to a physical object as part of the augmented or virtual reality environment.

8. A method as described in claim 1, wherein the specified traits of the behavior are specific to a target population.

9. A method as described in claim 1, wherein the specified traits of the behavior include environmental traits.

10. In a digital medium environment, a method implemented by at least one computing device having a hardware processor, computer-readable storage media and instructions stored on the computer-readable storage media and executable by the hardware processor to implement a digital rights management module to control access to a view of portions of digital content, the method comprising:

rendering, by the computing device, content included as part of an augmented or virtual reality environment;

displaying, by the at least one computing device, a representation of the digital content in which individual portions that are included as part of the digital content are not viewable, the representation of the digital content being displayed along with the content included as part of the augmented or virtual reality environment;

obtaining, by the at least one computing device, data describing user traits associated with users of the at least one computing device through use of a digital rights management module;

determining, by the at least one computing device, from the data using the digital rights management module that a first set of the user traits and a second set of the user traits meet specified traits of a behavior of a digital rights management policy enforced by the digital rights management module, the first set of the user traits and the second set of the user traits are mutually exclusive sets of the user traits; and displaying, by the at least one computing device, a first portion and a second portion of the individual portions that are included as part of the digital content responsive to the digital rights management module determining that the first and second sets of the user traits meet the specified traits of the behavior of the digital rights management policy.

11. A method as described in claim 10, wherein the specified traits of the behavior are not unique to the users.

12. A method as described in claim 10, wherein the specified traits of the behavior include at least one of: age, gender, geographic location, membership in a particular organization, business status, job title, or characteristics of a device used to access the digital content.

13. A method as described in claim 10, wherein the specified traits of the behavior are specific to a target population.

14. In a digital medium environment, a system comprising:

a hardware output device configured to provide an output as part of an augmented or virtual reality environment;

at least one hardware sensor configured to detect a physical environment in which the sensor is disposed; and a digital rights management module implemented at least partially by hardware of a computing device to:

receive an input from the at least one sensor that describes the physical environment;

identify a physical object in the physical environment based on the received input;

determine from data describing user traits associated with users as to whether a first set of the user traits and a second set of the user traits meet specified traits of a behavior of a digital rights management policy, the first set of the user traits and the second set of the user traits are mutually exclusive sets of the user traits; and control access via the output device to the physical object as part of the augmented or virtual reality environment based on the determination, the control of the access to the physical object comprising selecting to display a first and a second portion of digital content relative to the physical object as part of the augmented or virtual reality environment.

15. A system as described in claim 14, wherein the specified traits of the behavior are not unique to the users.

16. A system as described in claim 14, wherein the control of the access via the output device includes obscuring a view of the physical object as part of the augmented or virtual reality environment responsive to the determining of the digital rights management module that the first set of the user traits does not meet the specified traits of the behavior of the digital rights management policy.

17. A system as described in claim 14, wherein the control of the access via the output device includes obscuring sound associated with the physical object as part of the augmented or virtual reality environment responsive to the determining of the digital rights management module that the first set of the user traits does not meet the specified traits of the behavior of the digital rights management policy.

18. A system as described in claim 14, wherein the control of the access via the output device includes providing a view of the physical object as part of the augmented or virtual reality environment responsive to the determining of the digital rights management module that the first set of the user traits meet the specified traits of the behavior of the digital rights management policy.

19. A system as described in claim 14, wherein the specified traits of the behavior include at least one of: age, gender, geographic location, membership in a particular organization, business status, job title, or characteristics of a device used to access the content.

20. A system as described in claim 14, wherein the specified traits of the behavior are specific to a target population.

* * * * *